United States Patent
Antoinette et al.

(10) Patent No.: US 11,279,836 B2
(45) Date of Patent: Mar. 22, 2022

(54) INTUMESCENT NANOSTRUCTURED MATERIALS AND METHODS OF MANUFACTURING SAME

(71) Applicant: Nanocomp Technologies, Inc., Merrimack, NH (US)

(72) Inventors: Peter Antoinette, Nashua, NH (US); Mark Schauer, Peterborough, NH (US); Brian White, Bedford, NH (US); Meghann White, Bedford, NH (US); Mark A. Banash, Bedford, NH (US); David Gailus, Merrimack, NH (US)

(73) Assignee: Nanocomp Technologies, Inc., The Woodlands, TX (US)

( * ) Notice: Subject to any disclaimer, the term of this patent is extended or adjusted under 35 U.S.C. 154(b) by 428 days.

(21) Appl. No.: 15/401,507

(22) Filed: Jan. 9, 2017

(65) Prior Publication Data

US 2018/0194950 A1    Jul. 12, 2018

(51) Int. Cl.
*C09D 5/18* (2006.01)
*C08K 3/04* (2006.01)
(Continued)

(52) U.S. Cl.
CPC .............. *C09D 5/185* (2013.01); *C08K 3/016* (2018.01); *C08K 3/041* (2017.05); *C08K 3/042* (2017.05);
(Continued)

(58) Field of Classification Search
USPC ......... 428/342, 343, 446, 480, 425.1, 304.4, 428/402, 699, 921, 355 R, 305.5, 356;
(Continued)

(56) References Cited

U.S. PATENT DOCUMENTS 2,962,386 A    11/1960  Doll et al.
3,090,876 A     5/1963  Hutson
(Continued)

FOREIGN PATENT DOCUMENTS

CN         1614772        5/2005
CN      104884542 A1      9/2015
(Continued)

OTHER PUBLICATIONS

Thomson et al., "Ceramifying Polymers for Advanced Fire Protection Coatings", Ceram Polymerik Pty Ltd.
(Continued)

*Primary Examiner* — Lynda Salvatore
(74) *Attorney, Agent, or Firm* — Nanocomp Technologies, Inc.; Lewis Craft

(57) ABSTRACT

An intumescent nanostructured material for thermal protection comprising a member including a plurality of nanostructured materials, and an intumescent material associated with the member and configured to react in the presence of a heat source to form a foam for thermally insulating the member from the heat source. The member may be a non-woven sheet, a woven sheet, a yarn, or a network, and may be configured to conduct thermal energy away from a heat source. A solution comprising a plurality of nanostructured materials, an intumescent material, and a solvent, wherein the solution has a viscosity suitable for coating or spraying onto a surface of a substrate. The solution may have a viscosity of about 3000 centipoise to about 6000 centipoise, and possibly less than about 1000 centipoise. The solution, when dried on the substrate, may form a thermally-protective coating on the substrate.

53 Claims, 5 Drawing Sheets

(51) Int. Cl.
  *C08K 3/016* (2018.01)
  *C08K 5/00* (2006.01)
(52) U.S. Cl.
  CPC ...... *C08K 5/0066* (2013.01); *C08K 2201/011* (2013.01)
(58) Field of Classification Search
  USPC .......................................... 156/60, 71, 310
  See application file for complete search history.

(56) References Cited

U.S. PATENT DOCUMENTS

| | | | |
|---|---|---|---|
| 3,109,712 | A | 11/1963 | Redfern |
| 3,462,289 | A | 8/1969 | Rohl et al. |
| 3,706,193 | A | 12/1972 | Amato |
| 3,943,689 | A | 3/1976 | Kunz et al. |
| 4,468,922 | A | 9/1984 | McCrady et al. |
| 4,572,813 | A | 2/1986 | Arakawa |
| 4,583,247 | A | 4/1986 | Fingerhut et al. |
| 5,168,004 | A | 12/1992 | Daumit et al. |
| 5,428,884 | A | 7/1995 | Tsuzuki |
| 5,648,027 | A | 7/1997 | Tajiri et al. |
| 5,747,161 | A | 5/1998 | Iijima |
| 5,874,159 | A | 2/1999 | Cruise et al. |
| 6,036,774 | A | 3/2000 | Lieber et al. |
| 6,043,468 | A | 3/2000 | Toya et al. |
| 6,110,590 | A | 8/2000 | Zarkoob et al. |
| 6,143,412 | A | 11/2000 | Schueller et al. |
| 6,308,509 | B1 | 10/2001 | Scardino et al. |
| 6,333,016 | B1 | 12/2001 | Resasco et al. |
| 6,376,971 | B1 | 4/2002 | Pelrine et al. |
| 6,426,134 | B1 | 7/2002 | Lavin et al. |
| 6,452,085 | B2 | 9/2002 | Tauchi et al. |
| 6,541,744 | B2 | 4/2003 | Von Arx et al. |
| 6,611,039 | B2 | 8/2003 | Anthony et al. |
| 6,682,677 | B2 | 1/2004 | Lobovsky et al. |
| 6,703,104 | B1 | 3/2004 | Neal |
| 6,706,402 | B2 | 3/2004 | Rueckes et al. |
| 6,713,034 | B2 | 3/2004 | Nakamura et al. |
| 6,842,328 | B2 | 1/2005 | Schott et al. |
| 6,908,572 | B1 | 6/2005 | Derbyshire et al. |
| 6,923,946 | B2 | 8/2005 | Geohegan et al. |
| 6,979,709 | B2 | 12/2005 | Smalley et al. |
| 7,045,108 | B2 | 5/2006 | Jiang et al. |
| 7,182,929 | B1 | 2/2007 | Singhal et al. |
| 7,204,970 | B2 | 4/2007 | Smalley et al. |
| 7,323,157 | B2 | 1/2008 | Kinloch et al. |
| 7,413,474 | B2 | 8/2008 | Liu et al. |
| 7,437,938 | B2 | 10/2008 | Chakraborty |
| 7,491,883 | B2 | 2/2009 | Lee et al. |
| 7,615,097 | B2 | 11/2009 | McKechnie et al. |
| 7,615,204 | B2 | 11/2009 | Ajayan et al. |
| 7,641,829 | B2 | 1/2010 | Liang et al. |
| 7,670,970 | B2 | 3/2010 | Ko |
| 7,745,810 | B2 | 6/2010 | Rueckes et al. |
| 7,750,240 | B2 | 7/2010 | Jiang et al. |
| 7,846,414 | B2 | 12/2010 | Harbec et al. |
| 7,862,766 | B2 | 1/2011 | Liang et al. |
| 7,897,248 | B2 | 3/2011 | Barrera et al. |
| 7,898,079 | B2 | 3/2011 | Lashmore et al. |
| 8,071,906 | B2 | 12/2011 | Smiljanic et al. |
| 8,246,886 | B2 | 8/2012 | Lashmore et al. |
| 8,778,116 | B2 | 7/2014 | Morimoto et al. |
| 8,828,481 | B2 | 9/2014 | Burton et al. |
| 9,198,232 | B2 | 11/2015 | Lashmore et al. |
| 9,266,725 | B2 * | 2/2016 | VanDersarl ............... B82Y 5/00 |
| 2001/0003576 | A1 | 6/2001 | Klett et al. |
| 2002/0004028 | A1 | 1/2002 | Margrave et al. |
| 2002/0040900 | A1 | 4/2002 | Arx et al. |
| 2002/0113335 | A1 | 8/2002 | Lobovsky et al. |
| 2002/0136681 | A1 | 9/2002 | Smalley et al. |
| 2002/0179564 | A1 | 12/2002 | Geohegan et al. |
| 2003/0122111 | A1 | 1/2003 | Lee |
| 2003/0104156 | A1 | 6/2003 | Osada et al. |
| 2003/0109619 | A1 | 6/2003 | Keller et al. |
| 2003/0133865 | A1 | 7/2003 | Smalley et al. |
| 2003/0134916 | A1 | 7/2003 | Hrubesh |
| 2003/0143453 | A1 | 7/2003 | Ren et al. |
| 2003/0165648 | A1 | 9/2003 | Lobovsky et al. |
| 2003/0222015 | A1 | 12/2003 | Oyama et al. |
| 2004/0020681 | A1 | 2/2004 | Hjortstam et al. |
| 2004/0041154 | A1 | 3/2004 | Watanabe et al. |
| 2004/0053780 | A1 | 3/2004 | Jiang et al. |
| 2004/0018758 | A1 | 4/2004 | Mauthner et al. |
| 2004/0096389 | A1 | 5/2004 | Lobovsky et al. |
| 2004/0124772 | A1 | 7/2004 | Chen |
| 2004/0138046 | A1 * | 7/2004 | Sherwood, Jr. ... C04B 35/62897 501/95.1 |
| 2004/0177451 | A1 | 9/2004 | Poulin et al. |
| 2004/0223901 | A1 | 11/2004 | Smalley et al. |
| 2004/0235379 | A1 | 11/2004 | Ahluwalia et al. |
| 2004/0240144 | A1 | 12/2004 | Schott et al. |
| 2004/0265212 | A1 | 12/2004 | Varadan et al. |
| 2004/0265489 | A1 | 12/2004 | Dubin |
| 2004/0266065 | A1 | 12/2004 | Zhang et al. |
| 2005/0000559 | A1 | 1/2005 | Horio et al. |
| 2005/0006801 | A1 | 1/2005 | Kinloch et al. |
| 2005/0046017 | A1 | 3/2005 | Dangelo |
| 2005/0063658 | A1 | 3/2005 | Crowley |
| 2005/0067406 | A1 | 3/2005 | Rjarajan et al. |
| 2005/0070657 | A1 * | 3/2005 | Elkovitch ............... B82Y 30/00 524/495 |
| 2005/0074567 | A1 | 4/2005 | Lobovsky et al. |
| 2005/0087222 | A1 | 4/2005 | Muller-Werth |
| 2005/0087726 | A1 | 4/2005 | Anazawa et al. |
| 2005/0095938 | A1 | 5/2005 | Rosenberger et al. |
| 2005/0104258 | A1 | 5/2005 | Lennhoff |
| 2005/0112051 | A1 | 5/2005 | Liu et al. |
| 2005/0124246 | A1 | 6/2005 | Ko |
| 2005/0170089 | A1 | 8/2005 | Lashmore et al. |
| 2005/0209392 | A1 | 9/2005 | Luo et al. |
| 2005/0269726 | A1 | 12/2005 | Matabayas, Jr. |
| 2005/0281999 | A1 | 12/2005 | Hofmann et al. |
| 2006/0017191 | A1 | 1/2006 | Liang et al. |
| 2006/0048809 | A1 | 3/2006 | Onvural |
| 2006/0118158 | A1 | 6/2006 | Zhang et al. |
| 2006/0207643 | A1 | 9/2006 | Weaver, Jr. et al. |
| 2006/0234576 | A1 | 10/2006 | Smith et al. |
| 2006/0252853 | A1 | 11/2006 | Ajayan et al. |
| 2006/0269670 | A1 | 11/2006 | Lashmore et al. |
| 2006/0272701 | A1 | 12/2006 | Ajayan et al. |
| 2007/0009421 | A1 | 1/2007 | Kittrell et al. |
| 2007/0029291 | A1 | 2/2007 | Boulos et al. |
| 2007/0031662 | A1 * | 2/2007 | Devaux .................. B82Y 30/00 428/357 |
| 2007/0036709 | A1 | 2/2007 | Lashmore et al. |
| 2007/0048211 | A1 | 3/2007 | Jiang et al. |
| 2007/0056855 | A1 | 3/2007 | Lo et al. |
| 2007/0087121 | A1 | 4/2007 | Chang et al. |
| 2007/0089118 | A1 | 4/2007 | Aizaki et al. |
| 2007/0116627 | A1 | 5/2007 | Collier et al. |
| 2007/0122687 | A1 | 5/2007 | Sakurai et al. |
| 2007/0140947 | A1 | 6/2007 | Schneider et al. |
| 2007/0232699 | A1 | 10/2007 | Russell et al. |
| 2007/0236325 | A1 | 10/2007 | Bertin et al. |
| 2007/0293086 | A1 | 12/2007 | Liu et al. |
| 2008/0001284 | A1 | 1/2008 | Yuen et al. |
| 2008/0166563 | A1 | 7/2008 | Brittingham et al. |
| 2008/0170982 | A1 | 7/2008 | Zhang et al. |
| 2008/0238882 | A1 | 10/2008 | Sivarajan et al. |
| 2008/0254675 | A1 | 10/2008 | Lee et al. |
| 2008/0261116 | A1 | 10/2008 | Burton et al. |
| 2008/0296683 | A1 | 12/2008 | Yoon et al. |
| 2009/0042455 | A1 | 2/2009 | Mann et al. |
| 2009/0044848 | A1 | 2/2009 | Lashmore et al. |
| 2009/0047513 | A1 | 2/2009 | Lashmore |
| 2009/0059535 | A1 | 3/2009 | Kim et al. |
| 2009/0087640 | A1 | 4/2009 | Li et al. |
| 2009/0115305 | A1 | 5/2009 | Segal et al. |
| 2009/0117025 | A1 | 5/2009 | Lashmore et al. |
| 2009/0169819 | A1 | 7/2009 | Drzaic et al. |
| 2009/0194525 | A1 | 8/2009 | Lee et al. |
| 2009/0237886 | A1 | 9/2009 | Iwai et al. |

(56) References Cited

U.S. PATENT DOCUMENTS

| | | | |
|---|---|---|---|
| 2009/0255619 A1* | 10/2009 | Tong | E04B 1/94 156/71 |
| 2009/0255706 A1 | 10/2009 | Jiang et al. | |
| 2009/0266477 A1 | 10/2009 | Weisenberger | |
| 2009/0269511 A1 | 10/2009 | Zhamu et al. | |
| 2009/0277489 A1 | 11/2009 | Dannoux et al. | |
| 2009/0277897 A1 | 11/2009 | Lashmore et al. | |
| 2009/0305135 A1 | 12/2009 | Shi et al. | |
| 2009/0311166 A1 | 12/2009 | Hart et al. | |
| 2010/0000754 A1 | 1/2010 | Mann et al. | |
| 2010/0021682 A1 | 1/2010 | Liang et al. | |
| 2010/0028639 A1 | 2/2010 | Liang et al. | |
| 2010/0041297 A1 | 2/2010 | Jiang et al. | |
| 2010/0044074 A1 | 2/2010 | Kim et al. | |
| 2010/0196249 A1 | 8/2010 | Hata et al. | |
| 2010/0219383 A1 | 9/2010 | Eklund | |
| 2010/0220074 A1 | 9/2010 | Irvin, Jr. et al. | |
| 2010/0243227 A1 | 9/2010 | Wu et al. | |
| 2010/0243295 A1 | 9/2010 | Allemand et al. | |
| 2010/0252184 A1 | 10/2010 | Morimoto et al. | |
| 2010/0261821 A1 | 10/2010 | Park et al. | |
| 2010/0267205 A1 | 10/2010 | Ward et al. | |
| 2010/0270058 A1 | 10/2010 | Mahoney et al. | |
| 2010/0272978 A1 | 10/2010 | Kumar et al. | |
| 2010/0324656 A1 | 12/2010 | Lashmore et al. | |
| 2010/0328845 A1 | 12/2010 | Hiralal et al. | |
| 2011/0005808 A1 | 1/2011 | White et al. | |
| 2011/0007477 A1 | 1/2011 | Xu et al. | |
| 2011/0027491 A1 | 2/2011 | Rueckes et al. | |
| 2011/0110843 A1 | 5/2011 | Pasquali et al. | |
| 2011/0111279 A1 | 5/2011 | Smithyman et al. | |
| 2012/0045385 A1 | 2/2012 | Lashmore et al. | |
| 2012/0045644 A1 | 2/2012 | Wei et al. | |
| 2012/0118552 A1 | 5/2012 | White et al. | |
| 2015/0017856 A1 | 1/2015 | Davis et al. | |
| 2017/0043552 A1* | 2/2017 | Lenzi | B29C 70/025 |

FOREIGN PATENT DOCUMENTS

| | | |
|---|---|---|
| CN | 105155279 A | 12/2015 |
| DE | 10-2006-014171 | 9/2007 |
| EP | 1160861 | 12/2001 |
| EP | 2365117 | 9/2011 |
| JP | 1958-072036 | 5/1983 |
| JP | 2009-129793 | 5/1997 |
| JP | H09-509779 | 9/1997 |
| JP | 2000-058228 | 2/2000 |
| JP | 2003-518330 | 6/2003 |
| JP | 2004-051852 | 2/2004 |
| JP | 2004-315297 | 11/2004 |
| JP | 2005-075672 | 3/2005 |
| JP | 2005-116839 | 4/2005 |
| JP | 2005-281672 | 10/2005 |
| JP | 2006-335604 | 12/2006 |
| JP | 2007-009213 | 1/2007 |
| JP | 2007/051059 | 1/2007 |
| JP | 2007-182352 | 7/2007 |
| JP | 2008-523254 | 7/2008 |
| JP | 2009-242145 | 10/2009 |
| JP | 2009-252713 | 10/2009 |
| JP | 2010519093 A | 6/2010 |
| JP | 2011-508364 | 3/2011 |
| KR | 2005-0007886 | 1/2005 |
| WO | 1995/018517 | 7/1995 |
| WO | 2001/046967 | 6/2001 |
| WO | 2003/004741 | 1/2003 |
| WO | 2006/069007 | 6/2006 |
| WO | 2006/073460 | 7/2006 |
| WO | 2006137893 | 12/2006 |
| WO | 2007/003879 | 1/2007 |
| WO | 2007/015710 | 2/2007 |
| WO | 2007/086909 | 8/2007 |
| WO | 2007/089118 | 8/2007 |
| WO | 2007086878 | 8/2007 |
| WO | 2008/002071 | 1/2008 |
| WO | 2008/036068 | 3/2008 |
| WO | 2008/048286 | 4/2008 |
| WO | 2008/054364 | 5/2008 |
| WO | 2008106143 A2 | 9/2008 |
| WO | 2009/064133 | 5/2009 |
| WO | 2009/072478 | 6/2009 |
| WO | 2006/099156 | 9/2009 |
| WO | 2010/036405 | 1/2010 |
| WO | 2011/005964 | 1/2011 |
| WO | 2011/091257 | 7/2011 |
| WO | 2013137881 A1 | 9/2013 |
| WO | 2014080000 A1 | 5/2014 |

OTHER PUBLICATIONS

Intumescent. (Oct. 11, 2016). https://en.wikipedia.org/wiki/Intumescent.

"Metallurgical & Chemical Engineering", McGraw Publishing Co., vol. 15, No. 5, pp. 258-259, Dec. 15, 1916.

Biro, et al., "Direct Synthesis of Multi-Walled and Single-Walled Carbon Nanotubes by Spray-Pyrolysis", J. Optoelectronics and Advanced Materials, Sep. 2003; vol. 5, No. 3, pp. 661-666.

Braden et al., "Method to synthesis high volume fraction CNT composites by micro-alignment of carbon nanotubes through chemically assisted mechanical stretching", International Sampe Symposium and Exhibition (Proceedings), Material and Process Innovations: Change our World 2008 Soc. for the Advancement of Material and Process Engineering. International Business Office US, vol. 52, 2008, XP009183898.

D.S. Bethune et al., "Cobalt-catalyzed growth of carbon nanotubes with single-atomic-layer walls", Letters to Nature, 363:605-607 (1993).

E. F. Kukovitsky et al., "CVDgrowth of carbon nanotubefilms on nickel substrates", Applied Surface Science, 215:201-208 (2003).

Gou, J.G., "Single-Walled Carbon Nanotube Bucky Paper/Epoxy Composites: Molecular Dynamics Simulation and Process Development", PhD dissertation, The Florida State University, 2002, p. 9-126.

Gou, J.G., "Passage: Nanotube Bucky Papers and Nanocomposites", Ph.D. Dissertation, Marburg An Der Lahn, pp. 93-126, Jan. 1, 2002.

Gun-Do Lee et al., "Catalytic decomposition of acetylene on Fe(OO I): A first-principles study",The American Physical Society, Physical Review B66 081403R: 1-4 (2002).

"H. W. Zhu et al., ""'Direct Synthesis of Long Single-Walled Carbon Nanotube Strands""",Science, 296:884-886 (2002)."

"H.W. Kroto et al., ""C60: Buckminsterfullerene""", Letters To Nature, 318:162-163, (1985)."

Hanson, G.W., "Fundamental Transmitting Properties of Carbon Nanotube Antennas", IEEE Transactions on Antennas and Propagation, vol. 53, No. 11, pp. 3426-3435, Nov. 2005.

Jiang, et al., "Spinning Continuous Carbon Nanotube Yarns", Nature, Oct. 24, 2002, vol. 419, p. 801.

Ki-Hong Lee et al., "Control of growth orientation for carbon nanotubes", Applied Physics Letters, 82(3): 448-450, (2003).

Lee et al., "Synthesis of Carbon Nanotubes Over Gold Nanoparticle Supported Catalysts", Carbon, vol. 43, pp. 2654-2663, May 13, 2005.

Li, et al., "Direct Spinning of Carbon Nanotube Fibers from Chemical Vapor Deposition Synthesis", Apr. 9, 2004, vol. 304, pp. 276-278.

"M. Jose-Yacaman et al., ""Catalytic growth of carbon microtubules with fullerene structure""", Applied Physics Letters, 62(6):657-659 (1993)."

Merriam Webster Dictionary definition of "along", available at http://merriam-webster.com/dictionary/along (retrieved Sep. 16, 2010).

"N. Seo Kim et al., ""Dependence of the Vertically Aligned Growth of Carbon Nanotubes on the Catalysts""",The Journal of Physical Chemistry, 106(36):9286-9290 (2002)."

Pipes et al., "Helical carbon nanotube arrays: mechanical properties," Composites Science and Technology. 62: 419-428 (2002).

(56) References Cited

OTHER PUBLICATIONS

R.T.K. Baker et al., "Nucleation and Growth of Carbon Deposits from the Nickel Catalyzed Decomvosition of Acetvlene ",Journal of Catalysis, 26:51-62 (1972).
Schaevitz et al., "A Combustion-Based Mems Thermoelectric Power Generator", The 11th Conference on Solid-State Sensors and Actuators, Munich, Germany, Jun. 10-14, 2001.
Seo et al., "Synthesis and manipulation of carbon nanotubes," New Journal of Physics. 5: 120.1-120.22 (2003).
"Sumio Iijima, ""Helical microtubules of graphitic carbon"",Letters to Nature, 354:56-58, (1991)."
Tapaszto, et al., "Diameter and Morphology Dependence on Experimental Conditions of Carbon Nanotube Arrays Grown by Spray Pyrolysis", Carbon, Jan. 2005; vol. 43, pp. 970-977.
Xiao et al., "High-Mobility Thin-Film Transistors Based on Aligned Carbon Nanotubes", Applied Physics Letters, vol. 83, No. 1, pp. 150-152, Jul. 7, 2003.
Malik, Sharali et al.; "Failure mechanism of free standing single-walled carbon nanotube thin films under tensile load" Phyical Chemistry Chemical Physics; 2004,6, 3540-3544.
Su et al.; Continuous Production of Single-Wall Carbon Nanotubes by Spray Pyrolysis of Alcohol with Dissolved Ferrocene; Chemical Physics Letters; 420, pp. 421-425; 2005.
Australian Examiner's Report cited in AU Serial No. 2006249601 dated Jun. 24, 2010.
Australian Examiner's Report cited in AU Serial No. 2006350110 dated Feb. 9, 2010.
Canadian Search Report for Canadian Patent Application No. 2,609,712 dated Jul. 30, 2012.
European Search Report based on EP 06849762.7 dated Jan. 14, 2010.
European Search Report based on EP 09816625.9 dated Sep. 7, 2011.
European Search Report for European Patent Application No. 08726128.5 dated Aug. 10, 2012.
European Search Report for European Patent Application No. 10160098.9 dated Mar. 9, 2012.
European Search Report for European Patent Application No. 12160856.6 dated May 10, 2012.
European Search Report issued in European Application No. 09743711.5 dated Oct. 21, 2013.
Examiner's Report No. 1 issued in Australian Serial No. 2008219693 dated Nov. 28, 2011.
Final Office Action in U.S. Appl. No. 12/191,765 dated Oct. 28, 2010.
Final Office Action Issued for U.S. Appl. No. 12/437,535 dated Sep. 8, 2014.
Final Office Action Issued for U.S. Appl. No. 13/294,698 dated Jul. 17, 2014.
International Search Report based on PCT/US2009/043209 dated Mar. 3, 2010.
International Search Report based on PCT/US2010/041374 dated Sep. 8, 2010.
International Search Report for International Patent Application No. PCT/US12/20194 dated May 1, 2012.
International Search Report for International Patent Application No. PCT/US12/33300 dated Jul. 5, 2012.
International Search Report for International Patent Application No. PCT/US12/48665 dated Nov. 20, 2012.
International Search Report for International Patent Application No. PCT/US2012/020194 dated May 1, 2012.
Japanese Office Action Issued for 2011-508688 dated Jul. 1, 2014.
Japanese Office Action issued for Japanese Patent Application No. 2009-551705 dated May 29, 2012.
Japanese Office Action issued in Japanese Application No. 2011-508688 dated Nov. 19, 2013.
Japanese Office Action issued in Japanese Application No. 2011-508689 dated Nov. 19, 2013.
Non-Final Office Action in U.S. Appl. No. 12/140,263 dated Sep. 20, 2010.
Non-Final Office Action in U.S. Appl. No. 12/187,278 dated Sep. 29, 2010.
Non-Final Office Action in U.S. Appl. No. 12/437,537 dated Oct. 25, 2010.
Non-Final Office Action Issued for U.S. Appl. No. 13/445,576 dated Sep. 9, 2014.
Non-Final Office Action issued in U.S. Appl. No. 12/191,765 dated Apr. 4, 2011.
Non-Final Office Action issued in U.S. Appl. No. 12/841,768 dated May 26, 2011.
Office Action cited in U.S. Appl. No. 11/413,512 dated Jul. 8, 2010.
Office Action cited in U.S. Appl. No. 11/415,927 dated Feb. 22, 2010.
Office Action cited in U.S. Appl. No. 11/415,927 dated Sep. 9, 2010.
Office Action cited in U.S. Appl. No. 11/715,756 dated Jan. 25, 2010.
Office Action cited in U.S. Appl. No. 11/818,279 dated Jun. 2, 2010.
Office Action cited in U.S. Appl. No. 12/187,278 dated Jun. 11, 2010.
Office Action cited in U.S. Appl. No. 12/191,765 dated May 14, 2010.
Office Action cited in U.S. Appl. No. 12/390,906 dated Jul. 9, 2010.
Office Action issued for Australian Patent Application No. 2008311234 dated Feb. 14, 2012.
Office Action issued for Japanese Patent Application No. 2011-508689 dated Mar. 19, 2013.
Office Action issued for U.S. Appl. No. 12/038,408 dated Feb. 23, 2012.
Office Action issued for U.S. Appl. No. 12/437,535 dated Aug. 22, 2012.
Office Action issued for U.S. Appl. No. 12/437,535 dated Dec. 5, 2012.
Office Action issued for U.S. Appl. No. 12/437,538 dated Mar. 26, 2012.
Office Action issued for U.S. Appl. No. 12/437,538 dated Oct. 16, 2012.
Office Action issued for U.S. Appl. No. 12/566,229 dated May 4, 2012.
Office Action issued for U.S. Appl. No. 12/580,994 dated Mar. 12, 2012.
Office Action issued for U.S. Appl. No. 12/841,768 dated Mar. 13, 2013.
Office Action issued for U.S. Appl. No. 13/191,109 dated Mar. 28, 2013.
Office Action issued in Japanese Patent Application No. 2008/513499 dated Nov. 22, 2011.
PCT International Search Report based on PCT/US08/02548 dated Aug. 21, 2008.
Supplementary European Search Report based on EP 06851553.5 dated Nov. 15,2 010.
U.S. Office Action issued in U.S. Appl. No. 12/191,765 dated Dec. 3, 2013.
U.S. Office Action issued in U.S. Appl. No. 13/294,698 dated Jan. 2, 2014.
"Carbon nanotube-filled Instrumescent Multilayer Nanocoating on Cotton Fabric for Enhancing Flame Retardant Property" Xin Ding et al.

* cited by examiner

INTUMESCENT NANOSTRUCTURED MATERIALS AND METHODS OF MANUFACTURING SAME

BACKGROUND

The general field of fire protection of both structures and people depends on materials that can insulate as well as spread and dissipate heat. In particular, the field of intumescent materials relies on chemical reactions that absorb heat, create gasses and drive phase changes to create foams that help insulate. Present applications are limited as it can be difficult to accommodate intumescent materials into or on other materials, and to control properties of the foam created during a thermal event. Further, intumescent foams can break down quickly in the presence of a heat source, thereby limiting a duration for which they can protect structures and people from harm. Still further, intumescent foams have limited capabilities for dissipating heat away from a heat source.

SUMMARY

The present disclosure is directed to an intumescent nanostructured material for thermal protection. The thermal protection material may comprise a member, such as a non-woven sheet, a woven sheet, a yarn, or a pulp-like network, made of or otherwise containing a plurality of nanostructured materials, as well as an intumescent material associated with the member. The member, in some aspects, may be configured to act as scaffolding for accommodating and holding the intumescent material in place, as well as for conducting heat energy away from a heat source to avoid degradation or damage resulting from localized hot spots. The intumescent material, in some aspects, may be configured to react in the presence of the heat source to form a foam for thermally insulating the member (and any underlying structure to be protected) from the heat source.

Unique synergies between the nanostructured materials and the intumescent material provide highly-effective thermal and fire protection greater than that offered simply by its parts. The plurality of nanostructures forming the member may, on the nano-scale, promote foam morphologies having superior insulating and structural properties. Further, the member and the intumescent material may act to protect one another from heat, thereby improving the overall effectiveness and longevity of the thermal protection material.

The plurality of nanostructured materials, in some embodiments, may be coated with a ceramifying polymer material and/or a flame retardant for protecting the nanostructured materials from oxidation in the presence of the heat source. Further, the intumescent material may be combined with a blowing agent that thermally decomposes to produce gasses that facilitate formation of the foam.

Various embodiments of the non-woven sheet member may have a plurality of layers of intermingled and compacted nanotubes. Some of the nanotubes between adjacent layers may be intermingled with one another such that an adequate number of contact sites exists to bond the adjacent layers together to form a cohesive sheet having a layered structure similar to phyllo-dough. Such a non-woven sheet member may be configured to provide in-plane thermal conductivity for dissipating heat laterally away from a heat source, while minimizing through-plane thermal conductivity. In an embodiment, the non-woven member may have a nanotube areal density of about 20 g/m² to about 30 g/m².

Various embodiments of the yarn member may be defined by plurality of intermingled and twisted carbon nanotubes. The yarn member may be configured to provide thermal conductivity along its length, and to provide scaffolding structure for promoting formation of a layer of thermally-insulating foam as the intumescent material reacts in the presence of heat. In an embodiment, the yarn member may have a nanotube linear density of about 1 Tex to about 100 Tex.

Various embodiments of the woven member may be defined by a plurality of nanostructured yarn s woven, braided, or knitted with one another. The woven member may be configured to provide in-plane thermal conductivity along pathways defined by the plurality of nanostructured yarns.

Various embodiments of the pulp-like network may be formed by coating or spraying a solution of nanostructured materials, intumescent material, and solvent onto a substrate. The solution, in some embodiments, may have a viscosity of about 3000 centipoise to about 6000 centipoise, and in some cases, less than about 1000 centipoise. The nanostructured materials may form into a network on the substrate as the solution dries, providing scaffolding for accommodating and holding the intumescent material, as well as providing conduction pathways along the surface of the substrate for dissipating heat away from hot spots.

TECHNICAL FIELD

The present invention relates to flame resistant materials, and more particularly, heat and flame resistant articles manufactured from nanotubes and intumescent materials.

DESCRIPTION OF SPECIFIC EMBODIMENTS

Embodiments of the present disclosure provide an intumescent nanostructured material 100 having properties well-suited for thermal protection and/or fire protection. Various embodiments of intumescent nanostructured material 100 may be provided as defined members, such as sheets or yarns, for use as or incorporation into articles such as textiles, while others may come in the form of a viscous solution that can be coated or sprayed onto structures requiring protection from heat and/or flame and dried to form thermally-protective coatings. Unique synergies between the carbon nanotubes and intumescents of the presently-disclosed material 100 provide highly-effective thermal and fire protection greater than that offered simply by its parts, as described in more detail herein.

Figure 1:
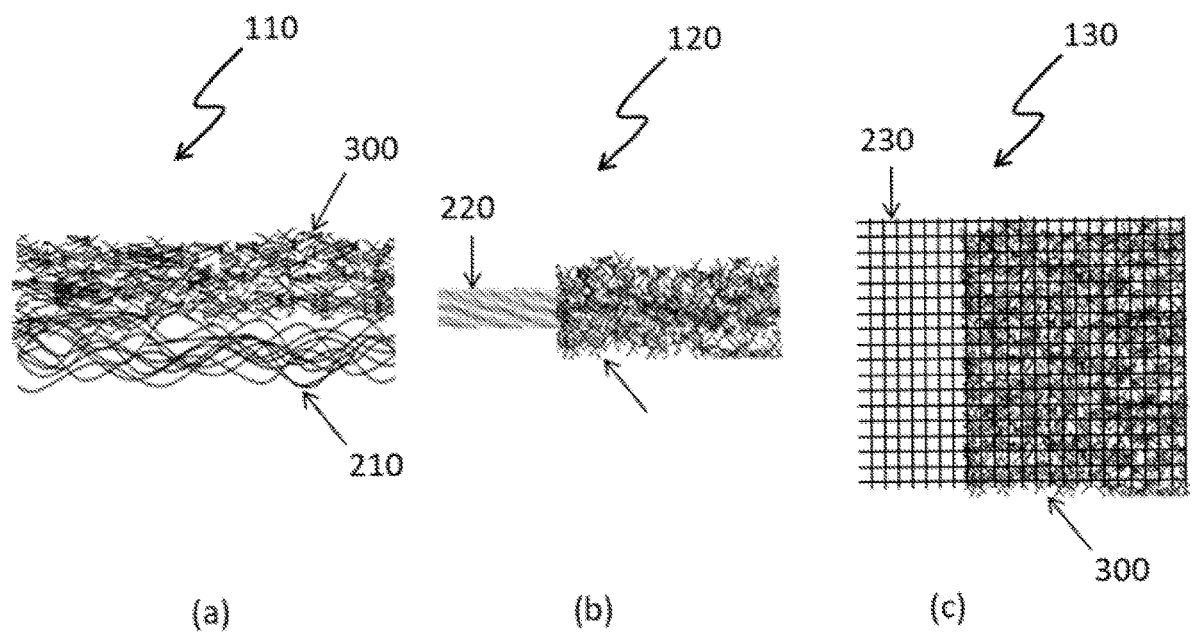
FIGS. 1A-1C depicts schematic views of a intumescent nanostructured material for thermal protection, including a non-woven member, a yarn member, and a non-woven member, respectively, according to various embodiments of the present disclosure.
Figure 2:
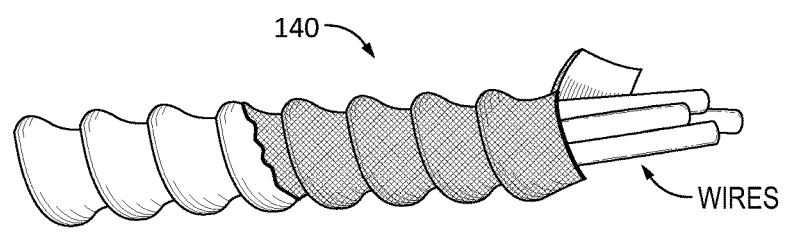
FIG. 2 depicts a intumescent nanostructured material coated onto a wire for thermal protection, according to an embodiment of the present disclosure.

Referring to FIGS. 1 and 2, embodiments of intumescent nanostructured material 100 may generally include a CNT member 200, such woven nanotube sheets, non-woven nanotube sheets, nanotube yarns, and nanotube networks, as well as an intumescent material 300. Generally speaking, intumescent materials are materials that release gasses upon heating, either through a chemical reaction or phase change. In various embodiments, CNT member 200 be coated or impregnated with intumescent material 300 and/or be formed from nanotubes pre-coated with intumescent material 300. CNT member 200, owing to the thermal conductivity of its nanotubes, as well as thermally conductive pathways created by the particular arrangement of nanotubes throughout the plane of member 200, may act to dissipate heat away from a heat source near material 100 thereby offering thermal protection. Intumescent material 300 may offer thermal protection by undergoing an endothermic chemical reaction and/or phase change in response to the application of heat to material 100 that removes the energy of vaporization while forming a foam that further insulates material 100 from the heat source.

While each component of intumescent nanostructured material 100 may serve a particular purpose in its own individual capacity, synergies between components of nanostructured material 100 provide for enhanced thermal protection characteristics beyond the sum of the individual parts of material 100. As further described in more detail below, CNT member 200, in one aspect, may serve as scaffolding for accommodating intumescent material 300 into various articles that may not otherwise accommodate intumescents in a suitable fashion, and holding intumescent material 300 in place on or within the article. In another aspect, CNT member 200 may provide, on the nano-scale, scaffolding for not only supporting the formation of insulating foams, but also influencing their specific morphologies, as intumescent material 300 reacts with an applied heat source. In doing so, the resulting open- and/or closed-cell foams generated from intumescent material 300 may have superior insulating properties when compared with those foams formed from similar intumescent materials 300 on or in other substrates or structures. Still further, CNT member 200 and intumescent material 300 act to protect one another from the applied heat, thereby improving the overall effectiveness and longevity of material 100 in providing thermal protection. In particular, by dissipating heat away from a hot spot, CNT member 200 may reduce the amount of heat to which intumescent material 300 is exposed, thereby delaying or slowing the reaction of intumescent material 300. This allows intumescent material 300 to vaporize at a slower rate, thereby removing the energy of vaporization over a longer period of time and improving the longevity of the foam by delaying its formation. Intumescent material 300, in turn, may protect CNT member 200 by itself dissipating heat energy and insulating CNT member 200 from heat exposure and its degrading effects on its structural integrity and that of its individual nanotubes. Stated otherwise, each protects the other, allowing material 100 to provide better overall thermal protection for longer periods of time.

Some embodiments of intumescent nanostructured material 100 may further include additives such as flame retardants and ceramifying polymers 400 such as polysilazane, polyureasilazane (PSZ) and other poly silazanes, such as Polyureamethylvinylsilazane Ceraset®, to enhance the strength of the CNT member 200 and its oxidation resistance characteristics, as further provided in more detail below.

CNT Member 200

Presently, there exist multiple processes and variations thereof for growing nanotubes, and forming yarns, sheets or cable structures made from these nanotubes. These include: (1) Chemical Vapor Deposition (CVD), a common process that can occur at near ambient or at high pressures, and at temperatures above about 400° C., (2) Arc Discharge, a high temperature process that can give rise to tubes having a high degree of perfection, and (3) Laser ablation.

The present invention, in one embodiment, employs a CVD process or similar gas phase pyrolysis procedures known in the industry to generate the appropriate nanostructures, including carbon nanotubes. Growth temperatures for a CVD process can be comparatively low ranging, for instance, from about 400° C. to about 1350° C. Carbon nanotubes (CNTs), may be characterized as single wall (SWNT), few wall (FWNT) or multiwall (MWNT). In this disclosure SWNT are described as consisting of a single graphene layer, FWNT will exhibit 2 or 3 layers in the wall structure, and MWNT walls will consist of 4 or more graphene layers. Although SWNT, FWNT and MWNT may be grown, in certain instances, FWNT may be preferred due to their higher growth rate relative to SWNT, and better properties than MWNT. Carbon Nanotubes may be grown, in an embodiment of the present invention, by exposing nanoscaled catalyst particles (for example 1 to 30 nanometers in diameter) in the presence of reagent carbon-containing gases (i.e., gaseous carbon source). In particular, the nanoscaled catalyst particles may be introduced into the reagent carbon-containing gases, either by addition of existing particles or by in situ synthesis of the particles from a metal-organic precursor, or even non-metallic catalysts. The formation and growth by CVD of carbon nanotubes in the gas phase, unbound by a substrate, is generally referred to as Floating Catalyst CVD (FC-CVD). The enhanced properties of FC-CVD are believed to be due to their tendency to form an extended network of branched nanotube bundles and aggregates as they cool from the furnace growth-zone. The network of branched nanotube bundles and aggregate structures, which can be rope-like, may offer advantages in handling, thermal conductivity, electronic properties, and strength.

The strength of the individual carbon nanotubes generated in connection with the present invention may be about 30 GPa or more. Strength, as should be noted, is sensitive to defects. However, the elastic modulus of the carbon nanotubes fabricated in the present invention may not be sensitive to defects and can vary from about 1 to about 1.2 TPa. Moreover, the strain to failure of these nanotubes, which generally can be a structure sensitive parameter, may range from about 5% to a maximum of about 25% in the present invention.

Furthermore, the nanotubes of the present invention can be provided with relatively small diameter. In an embodiment of the present invention, the nanotubes fabricated in the present invention can be provided with a diameter in a range of from less than 1 nm to about 30 nm. It should be appreciated that the carbon nanotubes made in accordance with one embodiment of the present invention may be extended in length (i.e., long tubes) when compared to commercially available carbon nanotubes. In an embodiment of the present invention, the nanotubes fabricated in the present invention can be provided with a length in the millimeter (mm) range, although once coalesced into an extended network of branched bundles, the unbroken network may extend indefinitely.

It should be noted that although reference is made throughout the application to nanotubes synthesized from carbon, other compound(s), such as boron, MoS2, nitrogen or a combination thereof may be used in the synthesis of nanotubes in connection with the present invention. For instance, it should be understood that boron nitride nanotubes may also be grown, but with different chemical precursors. In addition, it should be noted that boron and/or nitrogen may also be used to reduce resistivity in individual carbon nanotubes. Furthermore, other methods, such as plasma CVD or the like can also be used to fabricate the nanotubes of the present invention.

CNT member 200 may include any thermally conductive material containing carbon nanotubes. In an embodiment, CNT member 200 may include a non-woven sheet 210 of nanotubes, a nanotube yarn 220, a woven sheet 230 of nanotube yarns, or the like, or any combination thereof, as described in more detail below.

Non-Woven CNT Sheet 210

Figure 3:
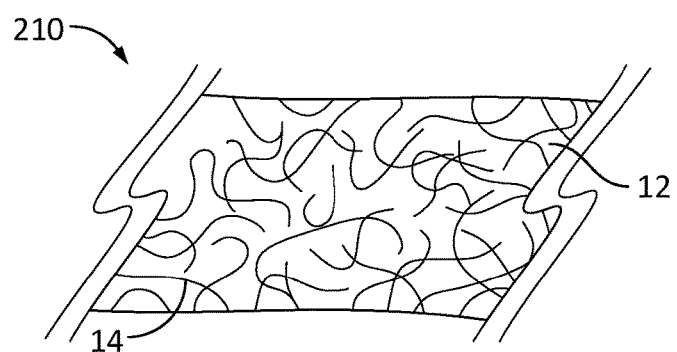
FIG. 3 depicts a non-woven nanotube sheet, according to an embodiment of the present disclosure.

Looking now at FIG. 3, the present invention provides, in an embodiment, a non-woven nanostructured CNT sheet 210. The non-woven CNT sheet 210 can be so designed to allow thermal conductivity along its length, i.e., within the plane of the CNT sheet 210. As shown in FIG. 3, the non-woven CNT sheet 210 may include a substantially planar body having be a single layer of a plurality of non-woven carbon nanotubes 14 deposited on top of one another from a cloud of CNT, or alternatively be multiple layers 51, each layer being a plurality of non-woven nanotubes deposited on top of one another from a cloud of CNT (see FIG. 4). In case of a multiple-layer sheet, the plurality of non-woven carbon nanotubes forms a layered structure resembling the layers of a phyllo-dough pastry, whereby each layer includes a plurality of non-woven carbon nanotubes deposited on top of one another from a cloud of CNT.

Figure 5:
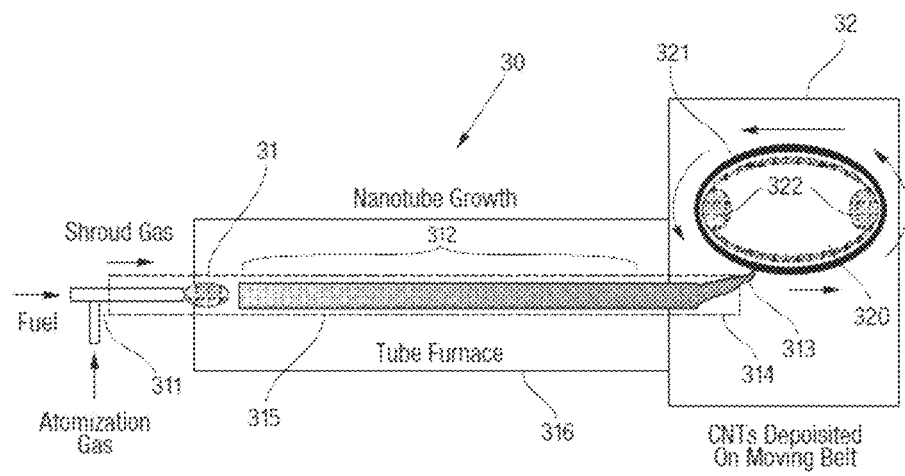
FIG. 5 depicts a system for forming a carbon nanotube sheet according to an embodiment of the present disclosure.

With reference now to FIG. 5, there is illustrated a system 30, similar to that disclosed in U.S. Pat. No. 7,993,620 (incorporated herein by reference in its entirety for all purposes), for use in the fabrication of nanotubes. System 30, in an embodiment, may be coupled to a synthesis chamber 31. The synthesis chamber 31, in general, includes an entrance end 311, into which reaction gases (i.e., gaseous carbon source) may be supplied, a hot zone 312, where synthesis of extended length nanotubes 313 may occur, and an exit end 314 from which the products of the reaction, namely the nanotubes and exhaust gases, may exit and be collected. The synthesis chamber 31, in an embodiment, may include a quartz tube 315 extending through a furnace 316. The nanotubes generated by system 30, on the other hand, may be individual nanotubes, bundles of such nanotubes, and/or intertwined nanotubes. In particular, system 30 may be used in the formation of a substantially continuous non-woven sheet generated from compacted and intermingled nanotubes and having sufficient structural integrity to be handled as a sheet.

System 30, in one embodiment of the present invention, may also include a housing 32 designed to be substantially airtight, so as to minimize the release of airborne particulates from within the synthesis chamber 31 into the environment. The housing 32 may also act to prevent oxygen from entering into the system 30 and reaching the synthesis chamber 31. In particular, the presence of oxygen within the synthesis chamber 31 can affect the integrity and compromise the production of the nanotubes 313. System 30 may also include an injector similar to those disclosed in application Ser. No. 12/140,263, now U.S. Pat. No. 9,061,913, which is incorporated herein by reference in its entirety for all purposes.

System 30 may also include a moving belt or drum 320 (referred to herein simply as belt 320 for simplicity), positioned within housing 32, designed for collecting synthesized nanotubes 313 made from a CVD process within synthesis chamber 31 of system 30. In particular, belt 320 may be used to permit nanotubes collected thereon to subsequently form a substantially continuous extensible structure 321, for instance, a non-woven sheet. Such a sheet may be generated from a matrix of compacted, substantially non-aligned, and intermingled nanotubes 313, bundles of nanotubes, or intertwined nanotubes, with sufficient structural integrity to be handled as a sheet.

Figure 6A:
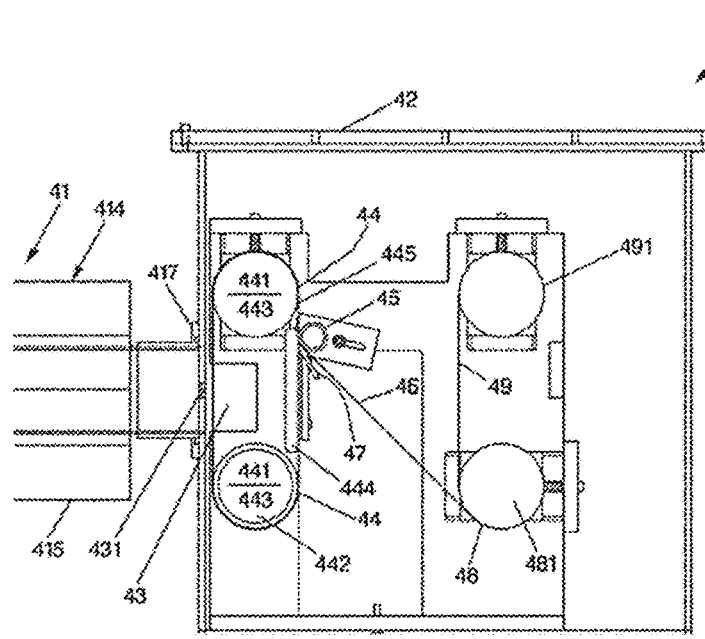
FIGS. 6A and 6B depict a system for harvesting a carbon nanotube sheet according to an embodiment of the present disclosure.
Figure 6B:
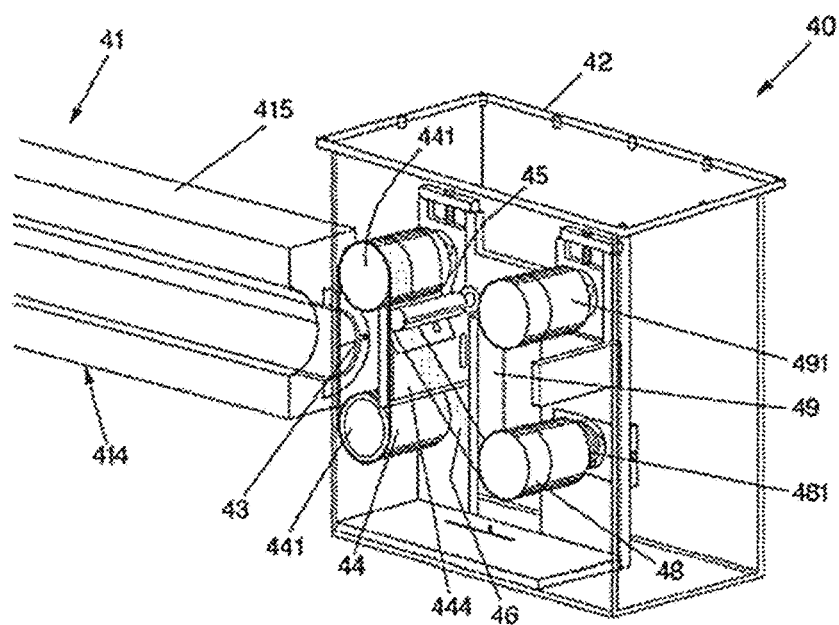

To collect the fabricated nanotubes 313, belt 320 may be positioned adjacent the exit end 314 of the synthesis chamber 31 to permit the nanotubes to be deposited on to belt 320. In one embodiment, belt 320 may be positioned substantially parallel to the flow of gas from the exit end 314, as illustrated in FIG. 5. Alternatively, belt 320 may be positioned substantially perpendicular to the flow of gas from the exit end 314 and may be porous in nature to allow the flow of gas carrying the nanomaterials to pass therethrough, as shown in FIGS. 6A and 6B. In one embodiment, belt 320 can be designed to translate from side to side in a direction substantially perpendicular to the flow of gas from the exit end 314, so as to generate a sheet that is substantially wider than the exit end 314. Belt 320 may also be designed as a continuous loop, similar to a conventional conveyor belt, such that belt 320 can continuously rotate about an axis, whereby multiple substantially distinct layers of CNT can be deposited on belt 320 to form a sheet 321, such as that shown in FIG. 4. To that end, belt 320, in an embodiment, may be looped about opposing rotating elements 322 and may be driven by a mechanical device, such as an electric motor. In one embodiment, the mechanical device may be controlled through the use of a control system, such as a computer or microprocessor, so that tension and velocity can be optimized. The deposition of multiple layers of CNT in formation of sheet 321, in accordance with one embodiment of the present invention, can result in minimizing interlayer contacts between nanotubes. Specifically, nanotubes in each distinct layer of sheet 321 tend not to extend into an adjacent layer of sheet 321. As a result, normal-to-plane thermal conductivity can be minimized through sheet 321.

To extent desired, a pressure applicator, such as roller 45, may be employed. Referring to FIGS. 6A and 6B, the pressure application may be situated adjacent to belt 44, that may be positioned substantially perpendicular to the flow of gas, so as to apply a compacting force (i.e., pressure) onto the collected nanomaterials. In particular, as the nanomaterials get transported toward roller 45, the nanomaterials on belt 44 may be forced to move under and against roller 45, such that a pressure may be applied to the intermingled nanomaterials while the nanomaterials get compacted between belt 44 and roller 45 into a coherent substantially-bonded sheet 46. To enhance the pressure against the nanomaterials on belt 44, a plate 444 may be positioned behind belt 44 to provide a hard surface against which pressure from roller 45 can be applied. It should be noted that the use of roller 45 may not be necessary should the collected nanomaterials be ample in amount and sufficiently intermingled, such that an adequate number of contact sites exists to provide the necessary bonding strength to generate the sheet 46.

To disengage the sheet 46 of intermingled nanomaterials from belt 44 for subsequent removal from housing 42, a scalpel or blade 47 may be provided downstream of the roller 45 with its edge against surface 445 of belt 44. In this manner, as sheet 46 moves downstream past roller 45, blade 47 may act to lift the sheet 46 from surface 445 of belt 44. In an alternate embodiment, a blade does not have to be in use to remove the sheet 46. Rather, removal of the sheet 46 may be manually by hand or by other known methods in the art.

Additionally, a spool or roller 48 may be provided downstream of blade 47, so that the disengaged sheet 46 may subsequently be directed thereonto and wound about roller 48 for harvesting. As the sheet 46 is wound about roller 48, a plurality of layers may be formed. Of course, other mechanisms may be used, so long as the sheet 46 can be collected for removal from the housing 42 thereafter. Roller 48, like belt 44, may be driven, in an embodiment, by a mechanical drive, such as an electric motor 481, so that its axis of rotation may be substantially transverse to the direction of movement of the sheet 46.

In order to minimize bonding of the sheet 46 to itself as it is being wound about roller 48, a separation material 49 (see FIGS. 6A and 6B) may be applied onto one side of the sheet 46 prior to the sheet 46 being wound about roller 48. The separation material 49 for use in connection with the present invention may be one of various commercially available metal sheets or polymers that can be supplied in a continuous roll 491. To that end, the separation material 49 may be pulled along with the sheet 46 onto roller 48 as sheet 46 is being wound about roller 48. It should be noted that the polymer comprising the separation material 49 may be provided in a sheet, liquid, or any other form, so long as it can be applied to one side of sheet 46. Moreover, since the intermingled nanotubes within the sheet 46 may contain catalytic nanoparticles of a ferromagnetic material, such as Fe, Co, Ni, etc., the separation material 49, in one embodiment, may be a non-magnetic material, e.g., conducting or otherwise, so as to prevent the sheet 46 from sticking strongly to the separation material 49. In an alternate embodiment, a separation material may not be necessary.

After the sheet 46 is generated, it may be left as a sheet 46 or it may be cut into smaller segments, such as strips. In an embodiment, a laser may be used to cut the sheet 46 into strips. The laser beam may, in an embodiment, be situated adjacent the housing such that the laser may be directed at the sheet 46 as it exits the housing. A computer or program may be employed to control the operation of the laser beam and also the cutting of the strip. In an alternative embodiment, any mechanical means or other means known in the art may be used to cut the sheet 46 into strips.

To the extent desired, an electrostatic field (not shown) may be employed to align the nanotubes, generated from synthesis chamber 31, approximately in a direction of belt motion. The electrostatic field may be generated, in one embodiment, by placing, for instance, two or more electrodes circumferentially about the exit end 314 of synthesis chamber 31 and applying a high voltage to the electrodes. The voltage, in an embodiment, can vary from about 10 V to about 100 kV, and preferably from about 4 kV to about 6 kV. If necessary, the electrodes may be shielded with an insulator, such as a small quartz or other suitable insulator. The presence of the electric field can cause the nanotubes moving therethrough to substantially align with the field, so as to impart an alignment of the nanotubes on moving belt.

Alternatively, the carbon nanotubes can be aligned by stretching following the synthesis of the carbon nanotube sheets as provided in co-pending U.S. application Ser. No. 12/170,092, which is incorporated herein by reference in its entirety for all purposes.

Figure 4:
FIG. 4 depicts a cross-sectional view of a phyllo-dough arrangement of nanotube layers within a non-woven nanotube sheet, according to an embodiment of the present disclosure.

System 30, as noted, can provide bulk nanomaterials of high strength in a non-woven sheet, as shown in FIG. 4. The carbon nanotubes 14, in an embodiment, can be deposited in multiple distinct layers 51 to from a multilayered structure or morphology in a single CNT sheet 210, as shown in FIG. 4. As noted above, nanofibrous non-woven sheet 210 may be made from the deposition of multiple distinct layers of either SWNT or MWNT carbon nanotubes. In an embodiment, the tensile strength of such a non-woven sheet 210 can be over 40 MPa for SWNT. Moreover, such a sheet may used with residual catalyst from the formation of the nanotubes. However, typical residuals may be less than 2 atomic percent.

By providing the nanomaterials in a non-woven sheet, the bulk nanomaterials can be easily handled while maintaining structural integrity and subsequently processed for end use applications. These materials are thermally conductive in-plane, have low thermal mass, are highly flexible, and are resistant to chemical degradation.

Furthermore, due to the thermal conduction characteristics of carbon nanotubes, the non-woven sheet 210 of the present invention can provide thermal protection by being thermally conductive within the plane of the sheet 210, while not being thermally conductive in a direction substantially normal to this plane. In particular, in the presence of a heat source, the carbon nanotubes in non-woven sheet 210 may act to conduct heat substantially rapidly away from the heat source, along the plane of the sheet 210, and toward a larger and relatively cooler area, for instance a heat sink. Moreover, because carbon nanotubes can be substantially resistant to high temperature oxidation, the non-woven sheet 210 made from carbon nanotubes generally can withstand (i.e., does not burn) temperature up to about 500° C.

Non-woven CNT sheet 210, in many embodiments, is formed almost entirely of nanotubes. Nanotube areal densities in various embodiments of non-woven sheet 210 may range from about 1 g/m$^2$ to about 50 g/m$^2$, and preferably about 10 g/m$^2$ to about 20 g/m$^2$. In some embodiments, there may be contaminants, such as iron (residual catalyst) attributable to between about 10% to about 15% of the weight of CNT sheet 210. Additionally or alternatively, CNT yarn 200 may include, in addition to the nanotubes, carbonaceous materials such as soot and polyaromatic hydrocarbons. These carbonaceous materials, in some embodiments, may be attributable to about 10% of the weight of CNT sheet 210.

The concentration of carbon nanotubes in non-woven CNT sheet 210 may vary across embodiments, depending on the desired application; however any particular concentration used may be a function of certain key considerations. One such consideration is thermal conductivity—in many embodiments, non-woven CNT sheet 210 may be provided with a high enough nanotube concentration to provide a level of thermal conductivity suitable for wicking away heat from a heat source at a desired rate. Another such consideration is providing sufficient structural scaffolding for supporting intumescent material 300, and in particular, the foam formed therefrom, as intumescent material 300 undergoes a reaction in the presence of heat, as described in more detail below.

CNT Yarn 220

Figure 7:
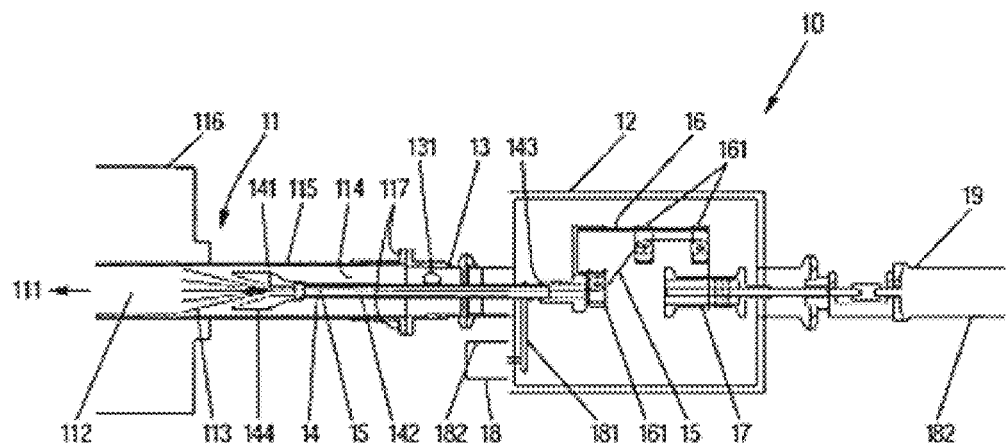
FIGS. 7-9 depict various systems for forming a nanotube yarn according to various embodiments of the present disclosure.
Figure 8:
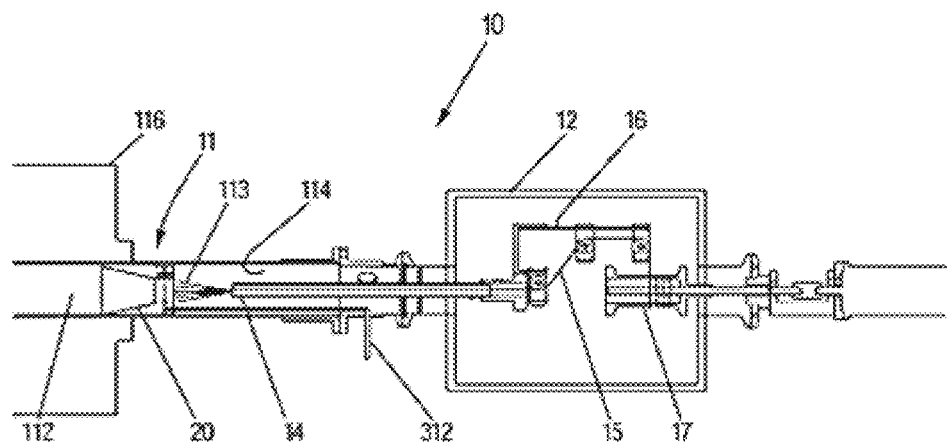
Figure 9:
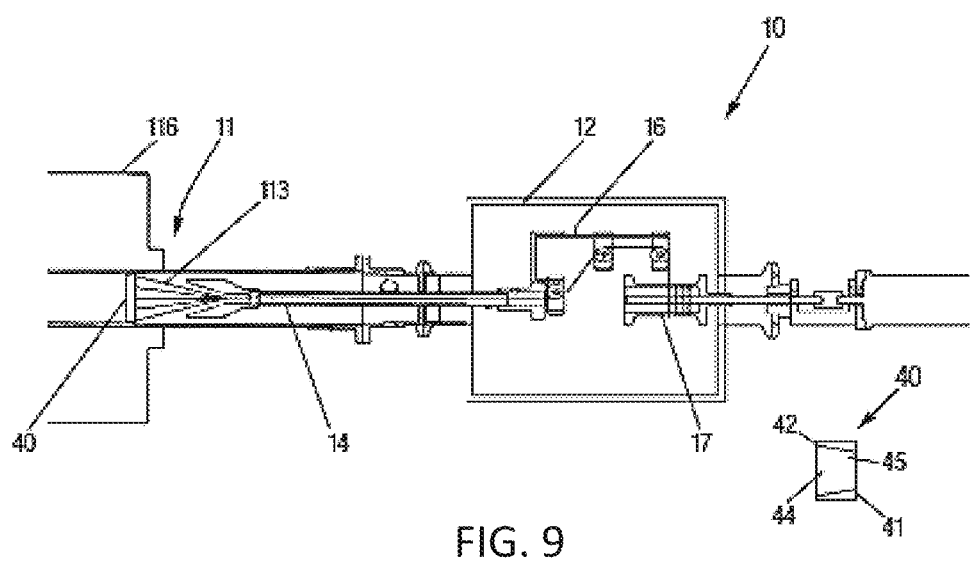

Looking now at FIGS. 7-9, a system 10 similar to system 30 may also be used for manufacturing nanotube yarns. To manufacture yarns, housing 32 can be replaced with an apparatus to receive nanotubes from the furnace 316 and spin them into yarns. The apparatus may include a rotating spindle that may collect nanotubes as they exit tube 315. The rotating spindle may include an intake end into which a plurality of tubes may enter and be spun into a yarn. The direction of spin may be substantially transverse to the direction of movement of the nanotubes through tube 315. Rotating spindle may also include a pathway along which the yarn may be guided toward an outlet end of the spindle. The yarn may then be collected on a spool. System 10 may be similar to that disclosed in application Ser. No. 11/488, 387, now U.S. Pat. No. 7,993,620, which is hereby incorporated herein by reference in its entirety for all purposes.

Rotating spindle 14, as shown in FIG. 7, may be designed to extend from within housing 12, through inlet 13, and into synthesis chamber 11 for collection of extended length nanotubes 113. In an embodiment, rotating spindle 14 may include an intake end 141 into which a plurality of nanotubes may enter and be spun into a yarn 220. In an embodiment, the direction of spin may be substantially transverse to the direction of movement of the nanotubes 113. Rotating spindle 14 may also include a pathway, such as hollow core 142, along which yarn 220 may be guided toward outlet end 143 of spindle 14. The intake end 141 of rotating spindle 14 may include a variety of designs. In one embodiment, intake end 141 may simply include an aperture (not shown) through which the nanotubes 113 may enter. Alternatively, it may include a funnel-like structure 144 that may serve to guide the nanotubes 113 into the intake end 141. Structure 144 can also serve to support yarn 220, should it break, until such time that it might be able to reconstitute itself from the twisting with newly deposited nanotubes 113. In one embodiment, a roller, capstan or other restrictive devices+ (not shown) may be provided adjacent the intake end 141 of spindle 14 in order to: (1) serve as a point from which yarn 220 may be twisted, and (2) prevent springiness in yarn 220 from pulling the yarn too quickly into the core 142 of spindle 14, which can prevent yarn 220 from re-forming if it were to break.

System 10 further includes a guide arm 16 which may be coupled to the outlet end 143 of rotating spindle 14 to guide and direct yarn 220 toward a spool 17 for gathering thereon. In accordance with one embodiment of the present invention, a set of pulleys 161, eyelets, or hooks may be provided as attachments to the guide arm 16 to define a path on which yarn 220 may be directed along the guide arm 16. Alternatively, yarn 220 may be permitted to pass through a tubular structure (not shown) that can direct yarn 220 from the outlet end 143 of spindle 14 to a point from which yarn 220 may be wound onto spool 17.

Guide arm 16 and rotating spindle 14, in an embodiment, may work together to induce twisting in yarn 220. The rotation of spindle 14 and guide arm 16 may be mechanically driven, for example, by an electric motor 18 coupled to the spindle 14 via a belt 181, for instance.

Spool 17, situated within housing 12, may be positioned, in one embodiment, downstream of guide arm 16 for the harvesting of yarn 220. In particular, yarn 220 advancing from guide arm 16 may be directed on to a spinning spool 17, such that yarn 220 may thereafter be wound circumferentially about spool 17. Although shown to be in axial alignment with rotating spindle 14, it should be appreciated that spool 17 may be placed at any other location within housing 12, so long as spool 17 may be spun about its axis to collect yarn 220 from guide arm 16. In an embodiment the axis of spin of spool 17 may be substantially transverse to the direction of movement of yarn 220 onto spool 17.

To impart rotation to spool 17, an additional mechanical drive 19 may be coupled to spool 17. In one embodiment, spool 17 may be synchronized to spin or rotate near or at substantially a similar rotation rate as that of spindle 14 to permit uniform harvesting of yarn 220 on to spool 17. Otherwise, if, for instance, the rate of rotation of spool 17 is faster than that of spindle 14, breakage of yarn 220 from guide arm 16 to spool 17 may occur, or if the rate is slower than that of spindle 14, loose portions from yarn 220 may end up entangled.

To maintain substantial synchronization of rotation rates, movement of mechanical drives 18 and 19 may be adjusted by a control system (not shown). In one embodiment, the control system may be designed to receive data from position sensors, such as optical encoders 182, attached to each of mechanical drives 17 and 18. Subsequently, based on the data, the control system may use a control algorithm in order to modify power supplied to each drive in order to control the rate of each drive so that they substantially match the rate of nanotube synthesis. As a result, the control system can impart: (1) constant yarn velocity controlled by set tension limits, or (2) constant tension controlled by velocity limits. In one embodiment, the yarn velocity can be reset in real time depending on the tension values, so that the tension may be kept within a preset limit. In addition, the yarn tension can be reset in real time depending on the velocity values, so that the tension can be kept within a set value.

The control system can also vary the rate between the spool 17 and spindle 14, if necessary, to control the yarn up-take by the spool 17. In addition, the control system can cause the spool 17 to move back and forth along its axis, so as to permit the yarn 220 to be uniformly wound thereabout.

In operation, under steady-state production using a CVD process of the present invention, extended length nanotubes may be collected from within the synthesis chamber 11 and yarn 220 may thereafter be formed. In particular, as the nanotubes 113 emerge from the synthesis chamber 11, they may be collected into a bundle, fed into the intake end 141 of spindle 14, and subsequently spun or twist into yarn 220 therewithin. It should be noted that a continual twist to yarn 220 can build up sufficient angular stress to cause rotation near a point where new nanotubes 113 arrive at the spindle 14 to further the yarn formation process. Moreover, a continual tension may be applied to yarn 220 or its advancement may be permitted at a controlled rate, so as to allow its uptake circumferentially about spool 17.

Typically, the formation of yarn 220 results from a bundling of nanotubes 113 that may subsequently be tightly spun into a twisting yarn. Alternatively, a main twist of yarn 220 may be anchored at some point within system 10 and the collected nanotubes 113 may be wound on to the twisting yarn 220. Both of these growth modes can be implemented in connection with the present invention.

Looking now at FIG. 8, a vortex generator, such as gas-spinner 20, may be provided toward the exit end 114 of synthesis chamber 11 to generate a substantial vortex flow in order to impart a twisting motion to the nanotubes 113 prior to being directed into spindle 14 and spun into yarn 220. The generation of a vortex to impart twisting motion may also serve to even out an amount of nanotube material used in the formation of yarn 220.

It should also be appreciated that by providing a solid constriction to the flow of gas and generated nanomaterials, the gas-spinner 20 can also allow substantial freedom in defining yarn and tow formation modes for system 10 of the present invention. Moreover, to the extent necessary, gas-spinner 20 can provide an area where nanotubes 113 may accumulate, particularly when the gas supplied through the gas-spinner 20 is at a low flow rate to create a source from which nanotubes 113 may be pulled, such as that by a leader (see description below) to subsequently twist into yarn 220.

In accordance with one embodiment of the present invention, at the inception of formation of yarn 220, it may be beneficial to start the yarn with a "leader." This leader, for example, may be an additional piece of nanotube yarn, some other type of yarn or filament, or a thin wire. In an embodiment, a wire may be used because it can provide the requisite stiffness necessary to transfer the twisting motion of the spindle 14 to the accumulating webbing or bundle of nanotubes 113 until there exist a sufficient build-up, such that the wire can tether an end of a growing yarn. The wire used, in one embodiment, may be, for example, a ferrous wire or Nichrome, since these alloys can withstand the temperature within the hot zone (600° C.-1300° C.) of the synthesis chamber 11. Moreover, nanotubes produced via a CVD process have been observed to adhere relatively well to these alloys. In particular, since catalytic nanoparticles at the end of the nanotubes 113 may include ferromagnetic materials, such as Fe, Co, Ni, etc., these nanoparticles can magnetically attract to the magnetic domains on the ferrous alloy materials.

To the extent that a leader is provided, it may be necessary to pre-thread the leader before the start of the reaction. Specifically, a hole, in one embodiment, may provided in the spool 17 to serve as an anchor point for one end of the leader. Additionally, notches or slots may be provided in the guide pulleys 161 to permit the leader to be easily inserted into the guide arm 16. The leader may then be inserted into the spindle 14, and thereafter advanced into the synthesis chamber 11 upstream to gas-spinner 20, should one be employed.

Looking at FIG. 9, when using a leader, an anchor 40 may be provided in place of gas-spinner 20 to provide a source from which the leader can pull nanotubes into the spindle 14 to initiate the yarn making process. In an embodiment, anchor 40 may be positioned toward the exit end 114 of synthesis chamber 11 to constrict the flow of gas and nanotubes 113 so that an accumulation of nanotubes 113 can be generated within the anchor 40. To do so, anchor 40 may be designed as a disc having a distal end 41, a proximal end 42, and a passageway 44 extending therebetween. As illustrated in FIG. 6, passageway 44 may taper from the proximal end 42 toward the distal end 41. In this manner, when nanotubes 113 enter passageway 44 toward constricted portion 45, the constricted portion 45 may act to accumulate nanotubes 113 thereat to provide a source for the leader. Although provided as being tapered or toroidal in shape, it should be appreciated that passageway 44 of anchor 40 may be designed to include a variety of forms, so long as it works to constrict the flow of gas and nanotubes 113 in chamber 11.

To enhance the accumulation of nanotubes there at, projections (not shown) or other similar designs may be provided at the constricted portion 45 to provide a surface to which a webbing or bundle of nanotubes 113 can attach. In one embodiment, anchor 40 can be positioned near furnace 116 where the nanotubes 113 may have a relatively greater tendency to adhere to solid surfaces. As it may be near furnace 16, anchor 40 may be made, in an embodiment, from a graphite material or any other material that would withstanding heat from furnace 16.

Assuming that the nanotubes 113 can be produced at a constant rate, the design and location of anchor 40 near furnace 116 can permit the nanotubes 113 to accumulate thereon at a uniform rate. To that end, a controlled source of nanotubes 113 may be generated for subsequent collection and formation of yarn 220 having substantially uniform properties. Furthermore, anchor 40 can act to provide a point from which the nanotubes 113 can be pulled to permit substantial alignment of the nanotubes 113 in a direction substantially coaxial with yarn 220. The ability to align the nanotubes 113 along an axis of yarn 220 can enhance load transfer between the nanotubes 113 to allow for the formation of a high strength yarn 220. Nevertheless, it should be appreciated that yarn 220 can be formed regardless of whether anchor 40 is present.

Synthesis and harvesting of yarn 220 may subsequently be initiated by causing the spool 17, spindle 14, guide arm 16, and leader to rotate. In one embodiment, after initiating the synthesis of nanotubes 113, the nanotubes 113 may be directed toward the leader to permit build-up or bundling of the nanotubes 113 thereon. Thereafter, once a webbing or bundling of nanotubes 113 begins to build up on the leader, and the leader can be withdrawn by causing the spool 17 to rotate at a slightly different rate than the spindle 14 and guide arm 16. The formation of the nanotube yarn 220, as described above, may proceed automatically thereafter once the leader has been withdrawn sufficiently from the hot zone 112 of synthesis chamber 11. In particular, the webbing of nanotubes 113 may be twisted into a yarn 220 at a point near the intake end 141 of spindle 14. The twisted portions of yarn 220 may then be allowed to move along the core 142 towards the outlet end 143 of spindle 14. Upon exiting the outlet end 143, the yarn 220 may be guided along guide arm 16 and directed toward the spool 17. The yarn 220 may thereafter be wound about spool 17 at a controlled rate.

In accordance with another embodiment, the system 10 may also be used for continuous formation of a tow (not shown) from nanotubes 113 synthesized within synthesis chamber 11. This tow may be later processed into a tightly wound yarn, similar to technologies common in the art of thread and yarn formation. In one embodiment, the tow may be collected using the hollow spindle 14, guide arm 16 and spool 17, as described above. The formed tow may extend from the spool 17, through the guide arm 16 and spindle 14 into the synthesis chamber 11 near the exit end 114. Nanotubes 113, in an embodiment, may accumulate on the tow by winding around the tow, as the tow spins rapidly and is slowly withdrawn. An anchor may not required for this mode of operation. However, should it be necessary to provide a point to which the growing end of the spinning tow may attach, an anchor may be used.

The formation of a yarn or tow in accordance with one embodiment of the present invention provides an approach to producing a relatively long fibrous structure capable of being employed in applications requiring length. In particular, the twisting action during formation of the yarn allows the staple fibers (i.e., nanotubes) to be held together into the larger fibrous structure (i.e., yarn). Additionally, the twisting of axially aligned fibers (i.e., nanotubes) can enhance load transfer between the fibers to allow for the formation of a high strength yarn.

Specifically, staple fibers, such as the nanotubes synthesized by the process of the present invention, can be provided with a high aspect ratio (e.g., >100:1 length:diameter). As a result, they can serve better than those with smaller aspect ratios to transfer structural loads between individual fibers within a yarn. While fibers with essentially infinite aspect ratio would be ideal, the length scale of structures in which the yarn may be incorporated better defines the length and aspect ratios required of the constituent fibers. For example, if it is necessary to bridge a distance of only one to two centimeters, fibers much longer than this distance may not required. Furthermore, within a yarn, load transfer typically occurs as an interaction between each of the contact points of adjacent fibers. At each contact point, each fiber may interact via, for example, a van der Waal's bond, hydrogen bond, or ionic interaction. As such, the presence of a plurality of fibers in the yarn of the present invention can increase the number of contact points and thus the bonding interaction between adjacent fibers to enhance load transfer between the fibers. Moreover, since twisting can further increase the number of contact points between constituent fibers in a yarn by forcing individual fibers closer together, it can be advantageous to the overall strength of the yarn to impart twisting. In this regard, the ability to independently control twisting and up-take velocity can be important in order to optimize strength.

The strength of the yarn can further be enhanced by increasing the bond strength between adjacent fibers. In one embodiment, the yarn may be impregnated with a matrix material, such as a polymer, or a surfactant molecule to crosslink adjacent fibers. Crosslinking the fibers using covalent or ionic chemical bonds can provide an additional means of improving the overall strength of the yarn.

It should be noted that since the number of contact points increases the opportunities for phonon or electron to transfer between adjacent nanotubes, the imparting of a twist to the yarn can also enhance the electrical and thermal conductivity of the yarn of the present invention. In the presence of a heat source, the carbon nanotubes in yarn 220 may act to conduct heat substantially rapidly away from the heat source, along the length of the yarn 220, and toward a larger and relatively cooler area, for instance a heat sink.

CNT yarn 220, in many embodiments, is formed almost entirely of nanotubes. Nanotube linear densities in various embodiments of CNT yarn 220 may range from about 0.5 Tex (g/km) to about 100 Tex or higher. In some embodiments, there may be contaminants, such as iron (residual catalyst) attributable to between about 10% to about 15% of the weight of CNT yarn 220. Additionally or alternatively, CNT yarn 220 may include, in addition to the nanotubes, carbonaceous materials such as soot and polyaromatic hydrocarbons. These carbonaceous materials, in some embodiments, may be attributable to about 10% of the weight of CNT yarn 220.

The concentration of carbon nanotubes in CNT yarn 220 may vary across embodiments, depending on the desired application; however any particular concentration used may be a function of certain key considerations. One such consideration is thermal conductivity—in many embodiments, CNT yarn 220 may be provided with a high enough nanotube concentration to provide a level of thermal conductivity suitable for wicking away heat from a heat source at a desired rate. Another such consideration is providing sufficient structural scaffolding for supporting intumescent material 300, and in particular, the foam formed therefrom, as intumescent material 300 undergoes a reaction in the presence of heat, as described in more detail below.

Woven CNT Sheet 230

In another embodiment of the present disclosure, CNT member 200 may include a woven CNT sheet 230 formed by weaving together, braiding, knitting, or otherwise combining in like manner multiple carbon nanotube yarns 220. Like non-woven CNT 210 and CNT yarns 220, woven CNT sheet 230 may exhibit good in-plane thermal conductivity, thereby helping to dissipate heat away from hot spots in an in-plane direction whilst minimizing through-plane heat transfer. Without wishing to be bound by theory, thermal energy may follow the independent conduction pathways form by each CNT yarns 220 woven into woven CNT sheet 230, carrying heat away from a hot spot in the X- and Y-directions with which the CNT yarns 220 are aligned. Woven CNT sheet 230, owing to the high strength of CNT yarns 220 from which it is made, may exhibit very high tensile strengths relative to non-woven sheets.

In yet another embodiment, CNT member 200 may be a composite article comprising woven CNT sheet 230 placed in contact with a non-woven CNT sheet 210. Such a configuration may exhibit the favorable characteristics of sheets 210 and 230. For example, in the composite article, woven CNT sheet 230 may contribute superior strength and thermal conductivity to the composite article, and non-woven CNT sheet 210 may contribute greater surface area and different microstructure. Intumescent material 300, in various embodiments, could be introduced into the yarns of woven CNT sheet 230, into the interstices between the yarns woven CNT sheet 230, into non-woven CNT sheet 210, or any combination thereof.

CNT Network 240

In yet another embodiment of the present disclosure, CNT member 200 may take the form of a CNT network 240. Generally speaking, CNT network 240 is formed by drying a solution of dispersed carbon nanotubes in a solvent. CNT network 240, in some embodiments, may further include one or more additives such as, without limitation, surfactants (for enhancing uniformity with which the nanotubes are distributed throughout the solution used to form the network), acids (for same purpose, as well as functionalizing the nanotubes), binder (for increasing viscosity of the solution and holding the various components of the network together). As later discussed in more detail, in an embodiment of intumescent nanostructured material 100, intumescent material 300 may be mixed into the solution used to form CNT network 240 to provide enhanced thermal protection capabilities. The resulting solution of nanostructured materials, intumescent material 300, and solvent may be coated or sprayed onto a surface and dried to form a thermally-protective coating (an embodiment of intumescent nanostructured material 100) including CNT network 240 and intumescent material 300, as later described in more detail.

The solution of nanostructured materials may be prepared according to any suitable method known in the art. Representative methods for forming the solution may be found in U.S. patent application Ser. No. 15/351,912, which is hereby incorporated by reference in its entirety for all purposes.

The concentration of nanostructured materials in the solution may vary across embodiments, depending on the desired application; however any particular concentration used may be a function of certain key considerations. One such consideration is thermal conductivity—in many embodiments, the solution may be provided with a high enough nanotube concentration to provide a level of thermal conductivity suitable for wicking away heat from a heat source at a desired rate. Another such consideration is providing sufficient structural scaffolding for supporting intumescent material 300 in CNT network 240, and in particular, the foam formed therefrom, as intumescent material 300 undergoes a reaction in the presence of heat, as described in more detail below. In various embodiments, the solution, in furtherance of these considerations, may contain carbon nanotubes in concentrations ranging from about 1% to about 80%, and preferably around 10% by volume.

Intumescent Material 300

Embodiments of intumescent nanostructured material 100 further include one or more intumescent materials 300 for enhancing thermal protection. When exposed to heat, intumescent materials undergo chemical reactions that results in the formation of a foam that insulates material 100 from further heat exposure and oxygen. During the reaction, heat energy is absorbed as hydrates boil and water vapor is released, thereby providing a cooling effect as the energy of vaporization is consumed. For a general frame of reference, many intumescent materials may undergo reaction and form the foam when exposed to temperatures of about 400° C. or greater.

Intumescent material 300 may include any suitable material that undergoes such an endothermic chemical reaction resulting in the formation of an insulating foam or similar material. Example intumescent materials include, without limitation, soft char (e.g., ammonium polyphosphate, pentaeyrthritol, and melamine in a binder of vinyl acetate or styrene acrylates) and hard char (e.g., sodium silicates, graphite). Intumescent material 300 may further include or be combined with a binder (e.g., various polymeric resins) for bonding material 300 to other materials, a blowing agent (e.g., melamine or urea) that thermally decomposes to produce gasses to facilitate formation of the intumescent foam, and/or fire-proofing agents (e.g., boric acid, borax, zinc borate, silazanes, ammonium polyphosphate) for preventing oxidation of materials in contact with intumescent material 300 (e.g., CNTs). Of course, any suitable intumescent material with the properties described herein is envisioned within the scope of the present disclosure. Intumescent material 300, in various embodiments, may be applied to CNT member 200 in any suitable manner. In an embodiment, intumescent material 300 may be dissolved in an appropriate solvent, rinsed into CNT member 200, which may then be dried to remove the solvent. Additional details are provided in Examples 1-8 below.

Synergies between CNT member 200 and intumescent 300 may allow for the creation of thicker foams with closed-cell morphologies as compared with those foams formed from intumescents included in polymer matrices. In one aspect, the high densities of carbon nanotubes included in CNT member 200 provide ample scaffolding for supporting the foam as it forms such that the cells of the foam are less likely to pop and collapse. As configured, the foam can grow thicker and retain a highly-insulating closed-cell morphology. Generally speaking, the synergies between CNT member 200 and intumescent 300 can be expected to lead to the generation of foams having smaller, stronger cells as compared to unsupported intumescents or intumescents mixed with non-CNT materials. Without wishing to be bound by theory, it is thought that the strength imparted by CNT member 200 reinforces the closed cells of the foam, causing smaller, more stable cells to form.

Ceramifying Polymer Material 400

Embodiments of intumescent material 100 can additionally be coated or impregnated with a ceramifying polymer material 400 to enhance the strength of the CNT member 200 and its oxidation resistance characteristics. Example ceramifying polymer materials include, without limitation, polysilazane, polyureasilazane (PSZ), and Polyureamethylvinylsilazane Ceraset® (Kion Corporation, Huntingdon Valley, Pa.). For simplicity, ceramifying polymer material 400 may be referred to herein as PSZ 400; however, it should be understood that the present disclosure is not intended to limit ceramifying polymer material 400 to only this embodiment. PSZ resin 400 may react with heat to form a heat-resistant ceramic coating on the carbon nanotubes of CNT member 200. This ceramic coating may help prevent or otherwise reduce thermal degradation or burning of the carbon nanotubes when exposed to high levels of heat, thereby improving the overall structural integrity of material 100 and its ability to provide thermal protection.

In some embodiments, PSZ 400 may be coated onto or impregnated into non-woven sheet 210, yarn 220, and woven sheet 230. To form the coating material, the PSZ 400 400 may be dissolved in acetone solutions in concentrations ranging from about 0.1% to about 20%, preferable around 3% by weight. Next, the solution may be coated onto the CNT member 200, and then allowed to air dry. Thereafter, the coated CNT member 200 may be hot pressed at an elevated temperature ranging from about 50° C. to about 300° C., and preferably around 200° C., for about 120 minutes. The pressure at which the hot pressing may be carried out can range from about 14.7 psi to about 20,000 psi. After hot-pressing, the resulting coated CNT member 200 may be ready to use. In some embodiments, PSZ 400 may be attributable to about 5% to about 80% of the weight of the PSZ 400-coated CNT member 200 (before application of intumescent material 300), and preferably about 20% to about 30% of the weight of the PSZ 400-coated CNT member 200 (before application of intumescent material 300).

The strength of this coated CNT member 200 can be increased as a result of this process from about 30 MPa to over about 300 MPa. In addition, exposure of the PSZ 400 coated CNT member 200 to a MAAP flame does not results in burning of the material. Rather, the silazane is converted to silicon oxide and most probably forms regions of well-bonded silicon carboid locking the structure together. In one embodiment, a CNT member 200 coated with PSZ 400 can withstand heat over 1000° C. or higher without burning for several minutes.

Interestingly, traditional non-CNT textiles treated with PSZ 400 saw no such benefits in testing.

PSZ 400 can also be included in varying concentrations in the solution used to form CNT network 240. In representative embodiments, PSZ 400 may be added in suitable concentrations to the solution such that PSZ 400 accounts for about 2% to about 50%, and preferably about 25%, of the dry weight of CNT network 240. Without wishing to be bound by theory, the PSZ 400 may exhibit certain synergies with intumescent material 300, beyond simply forming a protective ceramic coating around the nanotubes. In particular, PSZ 400 may undergo an endothermic reaction as it thermally decomposes, thus providing further thermal protection for intumescent nanostructured material 100 and the persons, animals, or objects it protects.

Additional Treatments

Intumescent nanostructured materials 100 of the present invention, in various embodiments, may be further treated to improve its mechanical integrity and/or thermal performance. In one such embodiment, material 100 may be coated and/or infiltrated with a polymer(s), which may protect the material from water, humidity and weather, as well as possibly affect the formation of the foam as intumescent material 300 undergoes endothermic reaction. Example polymers suitable for these purposes include, without limitation, PVC, EPDM, and Aramids. In an embodiment, these polymers may be added via dissolved monomers, or oligomers added together and reacted once infiltration is complete. Additionally or alternatively, in another embodiment, intumescent nanostructured material 100 may be coated and/or infiltrated with a flame retardant chemical(s), such as boric acid, borax, zinc borate, ammonium polyphosphate (APP), or any combination thereof. Testing has shown particularly favorable synergies between boric acid and APP, for example.

Example 1

Embodiments of an intumescent nanostructured material 110 may include non-woven CNT sheet 210, intumescent material 300, and ceramifying polymer 400. Depending on the particular embodiment, non-woven CNT sheet 210 may account for about 10% to about 50% of the dry weight of intumescent nanostructured material 110, intumescent material 300 may account for about 0% to about 70% of the dry weight of intumescent nanostructured material 110, and ceramifying polymer material 400 may account for about 25% of the dry weight of intumescent nanostructured material 110. In some embodiments, intumescent nanostructured material 110 may further include binder (e.g., vinyl acetate, styrene acrylates or polyurethane), which may account for about 3% to about 50% of the dry weight of intumescent nanostructured material 110. Additionally or alternatively, some embodiments of intumescent nanostructured material 110 may include flame retardant material(s) (e.g., boric acid), which may account for about 5% of the dry weight of intumescent nanostructured material 110.

Example 2

The intumescent nanostructured material 110 of Example 1 may be coated with intumescent material 140 (later described in Example 8) to form intumescent material 112. In some embodiments, a composite 114 may be formed by building up multiple layers of intumescent material 112 for enhanced thermal protection.

Example 3

Embodiments of an intumescent nanostructured material 120 may include CNT yarn 220, intumescent material 300, and ceramifying polymer 400. Depending on the particular embodiment, CNT yarn 220 may account for about 10% to about 90% of the dry weight of intumescent nanostructured material 120, intumescent material 300 may account for about 0% to about 50% of the dry weight of intumescent nanostructured material 120, and ceramifying polymer material 400 may account for about 30% of the dry weight of intumescent nanostructured material 120. In some embodiments, intumescent nanostructured material 120 may further include binder (e.g., vinyl acetate or styrene acrylates), which may account for about 0% to about 50% of the dry weight of intumescent nanostructured material 120. Additionally or alternatively, some embodiments of intumescent nanostructured material 120 may include flame retardant material(s) (e.g., boric acid), which may account for about 5% of the dry weight of intumescent nanostructured material 120.

Example 4

The intumescent nanostructured material 120 of Example 3 may be coated with intumescent material 140 (later described in Example 8) to form intumescent material 122. In some embodiments, a composite 124 may be formed by building up multiple layers of intumescent material 122 (e.g., twisting multiple yarns to form a wire or rope) for enhanced thermal protection.

Example 5

Embodiments of an intumescent nanostructured material 130 may include woven CNT sheet 230, intumescent material 300, and ceramifying polymer 400. Depending on the particular embodiment, non-woven CNT sheet 230 may account for about 0% to about 50% of the dry weight of intumescent nanostructured material 130, intumescent material 300 may account for about 10% to about 80% of the dry weight of intumescent nanostructured material 130, and ceramifying polymer material 400 may account for about 30% of the dry weight of intumescent nanostructured material 130. In some embodiments, intumescent nanostructured material 130 may further include flame retardant material(s) (e.g., boric acid), which may account for about 5% of the dry weight of intumescent nanostructured material 130.

Example 6

The intumescent nanostructured material 130 of Example 5 may be coated with intumescent material 140 (later described in Example 8) to form intumescent material 132. In some embodiments, a composite 134 may be formed by building up multiple layers of intumescent material 132 for enhanced thermal protection.

Example 7

The intumescent nanostructured material 132 or composite 134 of Example 6 may be overlaid with a non-woven CNT sheet 210 or intumescent material 110 to form intumescent material 136. In some embodiments, a composite 138 may be formed by building up multiple layers of intumescent material 136 for enhanced thermal protection.

Example 8

Embodiments of a thermally-protective coating 140 (also referred to herein as intumescent nanostructured material 140) may include CNT network 240, intumescent material 300, and ceramifying polymer 400. Depending on the particular embodiment, CNT network 240 may account for about 1% to about 10% of the dry weight of intumescent nanostructured material 140, intumescent material 300 may account for about 0% to about 70% of the dry weight of intumescent nanostructured material 140, and ceramifying polymer material 400 may account for about 25% of the dry weight of intumescent nanostructured material 140. In some embodiments, intumescent nanostructured material 140 may further include binder (e.g., vinyl acetate or styrene acrylates), which may account for about 3% to about 10% of the dry weight of intumescent nanostructured material 140. Additionally or alternatively, some embodiments of intumescent nanostructured material 140 may include flame retardant material(s) (e.g., boric acid), which may account for about 5% of the dry weight of intumescent nanostructured material 140. Solvent (e.g., acetone, xylenes, 1-methyl pyrholidone) may be used to adjust the viscosity of intumescent nanostructured material 140 to be suitable for layering or spraying. For example, solvent may be utilized to adjust the viscosity of intumescent nanostructured material 140 to about 3000 centipoise to about 6000 centipoise for coating/layering, and to about less than 1000 centipoise for spraying.

In one representative embodiment, intumescent nanostructured material 140 may be formed by rinsing a nanotube pulp in an about 2% to about 20% solution of ceramifying polymer 400 (e.g., Ceraset monomer) in acetone. The rinsed nanotube pulp may then be dried in an oven, for example, at about 100° C. for about 30 minutes to dry the ceramifying polymer 400 on the nanotubes. The coated nanotube pulp may be further baked to solidify the ceramifying polymer 400, for example, at about 200° C. for about 1 hour. The nanotubes now include a ceramifying polymer coating for additional protection.

Next, the nanotube pulp may be combined with intumescent material 300 (e.g., soft char, hard char), and any combination of binder, flame retardant, and solvent to create a viscous solution. The solution may be mixed in a high shear mixer until the nanotube pulp and intumescent material 300 are fully dispersed. The solution may then be diluted until it is the proper viscosity for coating/layering, spraying, or other suitable application.

In an embodiment, the solution may be mixed into liquid paint for coating or spraying onto an object for thermal protection. For example, about 2.5 g of coated nanotube pulp may be mixed well with about 100 g acrylic paint, along with about 5 g of boric acid, about 5 g of ammonium polyophosphate, and about 2.5 g of melamine. This may be diluted with 5% ethanol in water until a viscosity suitable for spraying is obtained. The viscous mixture is then ready for spraying on an object to provide thermal protection. Other suitable paints may include, without limitation, polyurethane- and oil-based paints.

Articles Made from Intumescent Nanostructured Material 100

Intumescent nanostructured material 100 may be used in a variety of practical applications, and in particular, for thermal protection and fire protection. For example, embodiments of material 100 formed from non-woven sheets 210 or woven sheets 230 may be integrated into or used as textiles, such as, without limitation, in fire blankets, firefighter suits, and fire-protective clothing for race car drivers, pilots, and the like. Similarly, embodiments of material 100 including yarn s 220 may be used in such textiles, as well as in other applications such as in cables and wires that may operate in hot environments or in close proximity to heat sources. Each may also be used in structures like fire-resistant or heat tolerant housings around heat sources like engines and heaters, or to surround things needing protection in an otherwise hot environment. Camping tents, awnings, and other structures often situated near flames or hot lamps may similarly benefit from incorporation of material 100.

The solution may be used to form thermally-protective layers 140 on components requiring thermal or fire protection. For example, the solution may be spray coated onto surfaces of I-beams and other structural members in buildings and vehicles and dried to form intumescent nanostructured material 140 thereon, which may prevent or delay weakening and ultimate collapse of the structure in the event of a fire. Further, the solution may be sprayed onto a substrate, dried, and peeled off as a sheet for similar applications as those listed above. The same may be done with the solution by filtering or molding the solution or CNT pulp to form a buckypaper-like form of intumescent nanostructured material 100. Such embodiments may be used in ways similar to sheets 210, 230 as described above. Additionally or alternatively, the solution could be coated onto and/or infiltrated into non-woven CNT sheet 210, CNT yarn 220, woven CNT sheet 230, or any combination thereof.

In still further embodiments, intumescent nanostructured material 100 may be applied to the back of a CNT heating element to provide a low-mass, fireproof insulating layer to keep the thermal energy of the heating elements from being conducted away from the target to be heated. Similarly, an integrated CNT heater and insulator backing may be formed by backing a CNT sheet or woven CNT yarn with intumescent nanostructured material 140 and appropriate additives. Such an article may be thermally processed at high temperature to create a stable heater with an integrated, flexible, insulated backing.

Of course, these are merely illustrative examples, and one of ordinary skill in the art may recognize further practical applications of various embodiments of intumescent nanostructured material 100 within the scope of the present disclosure.

While the present invention has been described with reference to certain embodiments thereof, it should be understood by those skilled in the art that various changes may be made and equivalents may be substituted without departing from the true spirit and scope of the invention. In addition, many modifications may be made to adapt to a particular situation, indication, material and composition of matter, process step or steps, without departing from the spirit and scope of the present invention. All such modifications are intended to be within the scope of the claims appended hereto.

What is claimed is:

1. An intumescent nanostructured material for thermal protection, comprising: a member coated or impregnated with a ceramifying polymer material comprising a silazane and including a plurality of nanostructured materials comprising a combination of graphene and nanotubes having a diameter ranging from 1 to 30 nm and an aspect ratio of length to diameter greater than 100:1, wherein the member contains residual iron in an amount up to 15 wt % based on the total weight of member; and an intumescent material associated with the member, and configured to react in the presence of a heat source to form a foam for thermally insulating the member from the heat source, wherein the intumescent nanostructured material is coated with one or more of polyvinyl chloride, EPDM, and an aramid.

2. An intumescent nanostructured material as set forth in claim 1, wherein the member is a non-woven sheet, a woven sheet, a yarn, or a network.

3. An intumescent nanostructured material as set forth in claim 1, wherein the intumescent material includes soft char, hard char, or a combination thereof.

4. An intumescent nanostructured material as set forth in claim 3, wherein the soft char includes one or a combination of ammonium polyphosphate, pentaeyrthritol, and melamine in a binder of vinyl acetate or styrene acrylates.

5. An intumescent nanostructured material as set forth in claim 3, wherein the hard char includes one or a combination of sodium silicate or graphite.

6. An intumescent nanostructured material as set forth in claim 1, wherein the intumescent material is combined with a blowing agent that thermally decomposes to produce gasses to facilitate formation of the foam.

7. An intumescent nanostructured material as set forth in claim 1, wherein the intumescent material is coated onto, infiltrated into, or mixed with the member.

8. An intumescent nanostructured material as set forth in claim 1, wherein the intumescent material reacts to form the foam at temperatures at or above about 400° C.

9. An intumescent nanostructured material as set forth in claim 1, further including a flame retardant for protecting the nanostructured materials from oxidation in the presence of the heat source.

10. An intumescent nanostructured material for thermal protection, comprising: a non-woven member coated or impregnated with a ceramifying polymer material comprising a silazane and having a plurality of layers of intermingled and compacted nanotubes having a diameter ranging from 1 to 30 nm and an aspect ratio of length to diameter greater than 100:1 and graphene, and wherein some of the nanotubes between adjacent layers are intermingled with one another such that an adequate number of contact sites exists to bond the adjacent layers together and wherein the non-woven member contains residual iron in an amount up to 15 wt % based on the total weight of the non-woven member; and an intumescent material coated onto the non-woven member, and configured to react in the presence of heat to form a foam, wherein the non-woven member is configured to provide in-plane thermal conductivity while minimizing through-plane thermal conductivity, wherein the intumescent nanostructured material is coated with one or more of polyvinyl chloride, EPDM, and an aramid.

11. An intumescent nanostructured material as set forth in claim 10, wherein the non-woven member has a nanotube areal density of about 20 g/m$^2$ to about 30 g/m$^2$.

12. An intumescent nanostructured material as set forth in claim 10, wherein the nanotubes act as scaffolding for accommodating and holding the intumescent material in place.

13. An intumescent nanostructured material as set forth in claim 10, wherein the nanotubes promote the foam to form with a substantially closed-cell structure.

14. An intumescent nanostructured material as set forth in claim 10, wherein the intumescent material includes soft char, hard char, or a combination thereof.

15. An intumescent nanostructured material as set forth in claim 14, wherein the soft char includes one or a combination of ammonium polyphosphate, pentaeyrthritol, and melamine in a binder of vinyl acetate or styrene acrylates.

16. An intumescent nanostructured material as set forth in claim 14, wherein the hard char includes one or a combination of sodium silicate or graphite.

17. An intumescent nanostructured material as set forth in claim 10, wherein the intumescent material is combined with a blowing agent that thermally decomposes to produce gasses to facilitate formation of the foam.

18. An intumescent nanostructured material as set forth in claim 10, wherein the intumescent material reacts to form the foam at temperatures at or above about 400° C.

19. An intumescent nanostructured material as set forth in claim 10, wherein the non-woven member accounts for about 10% to about 50% of the dry weight of the intumescent nanostructured material and the intumescent material is in a range of from greater than 0% to about 70% of the dry weight of the intumescent nanostructured material.

20. An intumescent nanostructured material as set forth in claim 10, further including a flame retardant for protecting the nanostructured materials from oxidation in the presence of the heat source.

21. An intumescent nanostructured material as set forth in claim 20, wherein the ceramifying polymer material coating or impregnating the non-woven member accounts for about 25% of the dry weight of the intumescent nanostructured material and the flame retardant accounts for about 5% of the dry weight of the intumescent nanostructured material.

22. An intumescent nanostructured material for thermal protection comprising: a yarn member coated or impregnated with a ceramifying polymer material comprising a silazane and defined by plurality of intermingled and twisted carbon nanotubes and graphene, wherein the carbon nanotubes having a diameter ranging from 1 to 30 nm and an aspect ratio of length to diameter greater than 100:1, and wherein the yarn member contains residual iron in an amount up to 15 wt % based on the total weight of the yarn member; and an intumescent material infiltrated into the yarn member, wherein the yarn member is configured to provide thermal conductivity along its length, and to provide scaffolding structure for promoting formation of a layer of thermally-insulating foam as the intumescent material reacts in the presence of heat, wherein the intumescent nanostructured material is coated with one or more of polyvinyl chloride, EPDM, and an aramid.

23. An intumescent nanostructured material as set forth in claim 22, wherein the yarn member has a nanotube linear density of about 1 Tex to about 100 Tex.

24. An intumescent nanostructured material as set forth in claim 22, wherein the nanotubes act as scaffolding for accommodating and holding the intumescent material in place.

25. An intumescent nanostructured material as set forth in claim 22, wherein the nanotubes promote the foam to form with a substantially closed-cell structure.

26. An intumescent nanostructured material as set forth in claim 22, wherein the intumescent material includes soft char, hard char, or a combination thereof.

27. An intumescent nanostructured material as set forth in claim 26, wherein the soft char includes one or a combination of ammonium polyphosphate, pentaeyrthritol, and melamine in a binder of vinyl acetate or styrene acrylates.

28. An intumescent nanostructured material as set forth in claim 26, wherein the hard char includes one or a combination of sodium silicate or graphite.

29. An intumescent nanostructured material as set forth in claim 22, wherein the intumescent material is combined with a blowing agent that thermally decomposes to produce gasses to facilitate formation of the foam.

30. An intumescent nanostructured material as set forth in claim 22, wherein the intumescent material reacts to form the foam at temperatures at or above about 400° C.

31. An intumescent nanostructured material as set forth in claim 22, wherein the yarn member accounts for about 10% to about 80% of the dry weight of the intumescent nanostructured material and the intumescent material accounts for about 10% to about 90% of the dry weight of the intumescent nanostructured material.

32. An intumescent nanostructured material as set forth in claim 22, further including a flame retardant for protecting the nanostructured materials from oxidation in the presence of the heat source.

33. An intumescent nanostructured material as set forth in claim 32, wherein the ceramifying polymer material coating or impregnating the yarn member accounts for about 25% of the dry weight of the intumescent nanostructured material and the flame retardant accounts for about 5% of the dry weight of the intumescent nanostructured material.

34. An intumescent nanostructured material for thermal protection comprising: a woven member coated or impregnated with a ceramifying polymer material comprising a silazane and defined by a plurality of nanostructured yarns of intermingled and twisted nanotubes and graphene, wherein the nanotubes have a diameter ranging from 1 to 30 nm and an aspect ratio of length to diameter greater than 100:1, the nanostructured yarns being woven, braided, or knitted with one another to form the woven member and wherein the woven member contains residual iron in an amount up to 15 wt % based on the total weight of the woven member; and an intumescent material infiltrated into the woven member, wherein the woven member is configured to provide in-plane thermal conductivity along pathways defined by the plurality of nanostructured yarns, wherein the intumescent nanostructured material is coated with one or more of polyvinyl chloride, EPDM, and an aramid.

35. An intumescent nanostructured material as set forth in claim 34, wherein the nanotubes act as scaffolding for accommodating and holding the intumescent material in place.

36. An intumescent nanostructured material as set forth in claim 34, wherein the nanotubes promote the foam to form with a substantially closed-cell structure.

37. An intumescent nanostructured material as set forth in claim 34, wherein the intumescent material includes soft char, hard char, or a combination thereof.

38. An intumescent nanostructured material as set forth in claim 37, wherein the soft char includes one or a combination of ammonium polyphosphate, pentaeyrthritol, and melamine in a binder of vinyl acetate or styrene acrylates.

39. An intumescent nanostructured material as set forth in claim 37, wherein the hard char includes one or a combination of sodium silicate or graphite.

40. An intumescent nanostructured material as set forth in claim 34, wherein the intumescent material is combined with a blowing agent that thermally decomposes to produce gasses to facilitate formation of the foam.

41. An intumescent nanostructured material as set forth in claim 34, wherein the intumescent material reacts to form the foam at temperatures at or above about 400° C.

42. An intumescent nanostructured material as set forth in claim 34, wherein the non-woven member accounts for about 10% to about 50% of the dry weight of the intumescent nanostructured material and the intumescent material accounts for about 0% to about 70% of the dry weight of intumescent nanostructured material.

43. An intumescent nanostructured material as set forth in claim 34, further including a flame retardant for protecting the nanostructured materials from oxidation in the presence of the heat source.

44. An intumescent nanostructured material as set forth in claim 43, wherein the ceramifying polymer material coating or impregnating the woven member accounts for about 25% of the dry weight of the intumescent nanostructured material and the flame retardant accounts for about 5% of the dry weight of intumescent nanostructured material.

45. An intumescent nanostructured material for thermal protection, comprising: a member coated or impregnated with a ceramifying polymer material comprising a silazane and having a first plurality of nanostructured materials comprising nanotubes having a diameter ranging from 1 to 30 nm and an aspect ratio of length to diameter greater than 100:1 and graphene, wherein the member contains residual iron in an amount up to 15 wt % based on the total weight of the member; and a coating on a surface of the member, the coating including a second plurality of nanostructured materials comprising nanotubes having a diameter ranging from 1 to 30 nm and an aspect ratio of length to diameter greater than 100:1 and graphene and an intumescent material, wherein the intumescent material of the coating is configured to react in the presence of a heat source to form a foam for thermally insulating the member from the heat source, and wherein the plurality of nanostructured material of the coating is configured to support the intumescent material during formation of the foam, wherein the intumescent nanostructured material is coated with one or more of polyvinyl chloride, EPDM, and an aramid.

46. An intumescent nanostructured material as set forth in claim 45, wherein the member is a non-woven sheet, a woven sheet, a yarn, or a network.

47. An intumescent nanostructured material as set forth in claim 45, wherein the intumescent material includes soft char, hard char, or a combination thereof.

48. An intumescent nanostructured material as set forth in claim 47, wherein the soft char includes one or a combination of ammonium polyphosphate, pentaeyrthritol, and melamine in a binder of vinyl acetate or styrene acrylates.

49. An intumescent nanostructured material as set forth in claim 47, wherein the hard char includes one or a combination of sodium silicate or graphite.

50. An intumescent nanostructured material as set forth in claim 45, wherein the intumescent material is combined with a blowing agent that thermally decomposes to produce gasses to facilitate formation of the foam.

51. An intumescent nanostructured material as set forth in claim 45, wherein the intumescent material is coated onto, infiltrated into, or mixed with the member.

52. An intumescent nanostructured material as set forth in claim 45, wherein the intumescent material reacts to form the foam at temperatures at or above about 400° C.

53. An intumescent nanostructured material as set forth in claim 45, further including a flame retardant for protecting the nanostructured materials from oxidation in the presence of the heat source.

* * * * *